(12) United States Patent
Uchida et al.

(10) Patent No.: US 9,354,741 B2
(45) Date of Patent: May 31, 2016

(54) TOUCH PANEL CONTROLLER AND SEMICONDUCTOR DEVICE

(71) Applicant: Synaptics Display Devices GK, Tokyo (JP)

(72) Inventors: Yusuke Uchida, Tokyo (JP); Tatsuya Ishii, Tokyo (JP); Tsuyoshi Kuroiwa, Tokyo (JP); Akihito Akai, Tokyo (JP); Hisayoshi Kajiwara, Tokyo (JP); Kazuo Okado, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 310 days.

(21) Appl. No.: 14/166,971

(22) Filed: Jan. 29, 2014

(65) Prior Publication Data

US 2014/0210750 A1     Jul. 31, 2014

(30) Foreign Application Priority Data

Jan. 30, 2013   (JP) .................................. 2013-015237

(51) Int. Cl.
*G06F 3/041*     (2006.01)
*G06F 3/044*     (2006.01)

(52) U.S. Cl.
CPC .............. *G06F 3/0416* (2013.01); *G06F 3/044* (2013.01)

(58) Field of Classification Search
CPC .............................. G06F 3/044; G06F 3/0416
See application file for complete search history.

(56) References Cited

U.S. PATENT DOCUMENTS

2008/0062151 A1*   3/2008  Kent .................... G06F 3/0418
                                                          345/177
2010/0328274 A1    12/2010 Noguchi et al.

FOREIGN PATENT DOCUMENTS

JP         2011-013760 A      1/2011

* cited by examiner

*Primary Examiner* — Charles Hicks
(74) *Attorney, Agent, or Firm* — Miles & Stockbridge P.C.

(57) ABSTRACT

The touch panel controller activates a touch panel having a detection plane superposed on a display plane of a display device, and performs a touch detection. The touch panel controller uses a cycle of 1/n (n is a positive integer) of a display frame cycle on the display plane as the detection frame cycle of the detection plane. The touch panel controller decides an order of driving the detection-scan electrodes in each detection frame cycle according to predetermined phase-delay and phase-advance positions with respect to a display-scan electrode drive position of the display device so as to correspond to an order of the detection-scan electrode array of the touch panel. The touch panel controller makes possible to avoid the coincidence of display-scan and touch-detection positions without thinning touch detections even with the detection frame cycle of a touch sensor shorter than the display frame cycle of a liquid crystal panel.

22 Claims, 9 Drawing Sheets

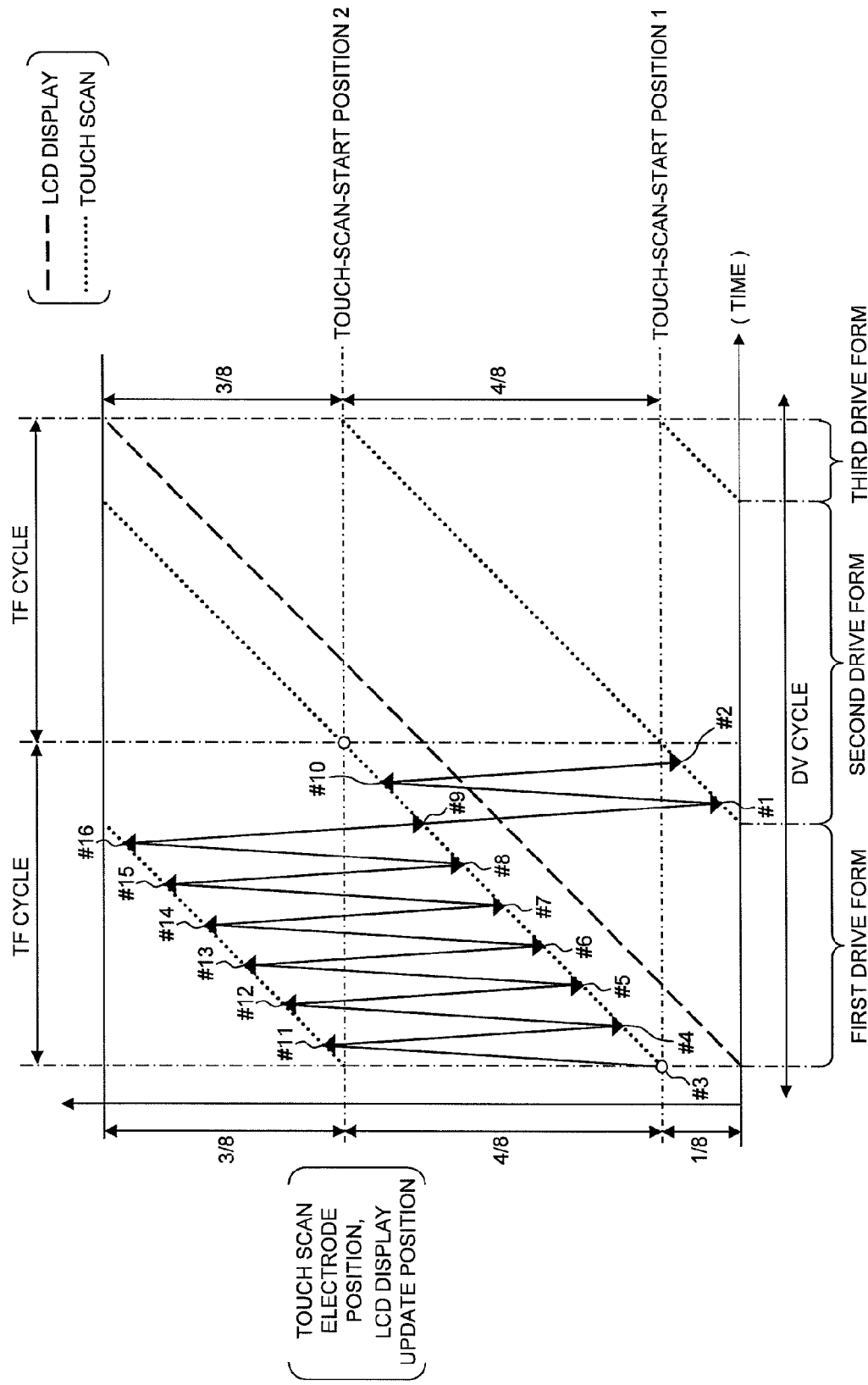

TOUCH PANEL CONTROLLER AND SEMICONDUCTOR DEVICE

CROSS-REFERENCE TO RELATED APPLICATIONS

The Present application claims priority from Japanese application JP 2013-015237 filed on Jan. 30, 2013, the content of which is hereby incorporated by reference into this application.

BACKGROUND

The present invention relates to a technique for controlling a touch-detection position on a touch panel with respect to a display-scan position on a display device, and particularly to a technique in connection with a touch panel controller and a semiconductor device with a touch panel controller arranged in an on-chip form, and useful in application to e.g. an information terminal device having a touch panel integrated with a display device.

A portable information terminal device such as a tablet or a smart phone has, on its front face, a touch panel integrated with a liquid crystal panel, and is arranged to be able to determine what operation has been ordered from a touch coordinate where a multipoint touch has been performed on the touch panel according to screen display on the display panel. A mutual capacitance type touch panel which supports such multipoint touch has drive electrodes and detection electrodes arranged to intersect one another, and a number of detection capacitances formed at intersections of the drive and detection electrodes like a matrix. Such a touch panel integrates changes in voltage arising on the detection electrodes through the detection capacitances while driving the drive electrodes sequentially, thereby forming detection signals. In case that a finger is brought close to the detection capacitances, the stray capacitance of the finger is combined with the detection capacitances, and thus the combined capacitance values become smaller. A mutual capacitance type touch panel is arranged to discriminate between the states of "being touched" and "being untouched" based on the differences of the detection signals according to the changes of the capacitance values.

A liquid crystal panel has a thin-film transistor, which is referred to as TFT, arranged at each intersection point of the display-scan electrodes and signal electrodes arranged to intersect with one another. The thin-film transistors each have a gate connected to the display-scan electrode, and a source connected to the signal electrode, and a drain connected to a common electrode through a liquid crystal element and a storage capacitor which constitute a sub-pixel, and each form a pixel. In display control, the display-scan electrodes are driven sequentially, the thin-film transistors are turned ON for each display-scan electrode, and thus current is caused to flow between the source and drain of TFT concerned. The signal voltages supplied to the source electrode lines at this time are applied to the liquid crystal elements, whereby the transmissive state is controlled.

In order to reduce, in size, a structure that a liquid crystal panel and a touch panel are integrated into one unit, electrodes of the touch panel are arranged, in part, to double as the electrodes of the liquid crystal panel. If not so arranged, the electrodes of the touch panel and those of the liquid crystal panel are laid out close to each other. For instance, in a case where the display-scan electrodes of the liquid crystal panel double as the detection-scan electrodes of the touch panel or they are arranged close to the detection-scan electrodes, the coincidence between the liquid crystal panel and the touch panel in drive positions of their electrodes causes the interference between signals thereof, resulting in distorted display and the worsening of the accuracy of touch detection.

In such a case, on condition that the display frame cycle of the liquid crystal panel is equal to the detection frame cycle of the touch sensor, the coincidence of the timing of selecting the electrode between the liquid crystal panel and the touch panel can be avoided by setting a fixed phase difference between the cycle of driving the display-scan electrodes (i.e. the cycle of overwriting data on the liquid crystal elements) in the liquid crystal panel, and the drive cycle (i.e. touch-scan cycle) of the detection-scan electrodes in the touch panel. However, with the detection frame cycle of the touch sensor shorter than the display frame cycle of the liquid crystal panel, only setting the fixed phase difference is not adequate because there is always the timing with which the time of touch scan goes ahead of the time of overwriting the liquid crystal element, and the touch scan interferes with the display by the liquid crystal panel, posing a problem such as the distorted display.

For the problem like this, measures have been known. Some of them are disclosed in JP-A-2011-13760. In the first measure taken therein, the electrodes are scanned while skipping at least one drive electrode (or two or more drive electrodes) at a point at which the drive of the electrode for detection scan would go ahead of the drive of the electrode for display scan or around it. This is so-called means for thinning touch detections. In the second measure, the scan for touch detection is performed dividedly so as to prevent the formation of a point at which the drive of the electrode for detection scan would go ahead of the drive of the electrode for display scan; the detection scan after the division will be performed on a total of m drive electrodes partially and sequentially.

SUMMARY

It has been found that on condition that the detection frame cycle of a touch sensor is made 1/n of the display frame cycle of a liquid crystal panel, provided that n is an integer larger than one, the following problems still remain even if the interference is avoided by suspending the touch detection for that position, otherwise changing the order of touch detection in a situation where a coincidence between the display-scan position and the touch-detection position is forecasted, as described in JP-A-2011-13760. The first is thinning touch detections worsens the accuracy of touch detection. The second is the display-scan position at the top and end of a display frame coincides with the touch-detection position even if the order of touch detection is changed and therefore, the influence of noise owing to the mutual interference can be cancelled out completely.

It is an object of the invention to provide a touch panel controller arranged so that the coincidence of the display-scan position and the touch-detection position can be avoided without thinning touch detections even with the detection frame cycle of a touch sensor shorter than the display frame cycle of a liquid crystal panel. Also, it is an object of the invention to provide, by use of such touch panel controller, a semiconductor device which is useful for increasing the accuracy of touch detection, and suppressing the reduction in display quality of a display device.

The above and other problems of the invention and a novel feature thereof will become apparent from the description hereof and the accompanying drawings.

Of the embodiments herein disclosed, the representative embodiment will be briefly outlined below.

A touch panel controller operable to activate a touch panel with its detection plane superposed on a display plane of display device to perform a touch detection sets a detection frame cycle of the detection plane to be a cycle of 1/n (n is a positive integer) of a display frame cycle for the display plane, and decides an order of driving detection-scan electrodes in each detection frame cycle according to a predetermined phase-delay position and a predetermined phase-advance position with respect to a drive position of the display-scan electrodes of the display device so as to correspond to the order of the array of detection-scan electrodes of the touch panel.

Of the embodiment herein disclosed, the representative embodiment brings about the effect as briefly described below.

The spatial distance between a display-scan position and a touch-detection-scan position can be constantly kept at any time in each display frame cycle and consequently, the mutual interference between the electrodes located these positions can be prevented. Therefore, even with the detection frame cycle of a touch panel shorter than the display frame cycle of a display device, the coincidence between a display-scan position and a detection-scan position can be prevented without thinning touch detections, which is useful for increasing the accuracy of touch detection, and suppressing the reduction in the display quality of a display device. The effect and advantage as described above are ensured even in a case where detection-scan electrodes of a touch panel (or other electrodes varying in potential in line with the potential change thereon) partially double as part of display-scan electrodes of a display device (or other electrodes varying in potential in line with the potential change thereon) are partially.

BRIEF DESCRIPTION OF THE DRAWINGS

FIG. 9 is an explanatory diagram showing, by example, the order of driving the scan-drive electrodes according to the seventh embodiment of the driving-order-calculation logic.

DETAILED DESCRIPTION

1. Summary of the Embodiments

Figure 1:
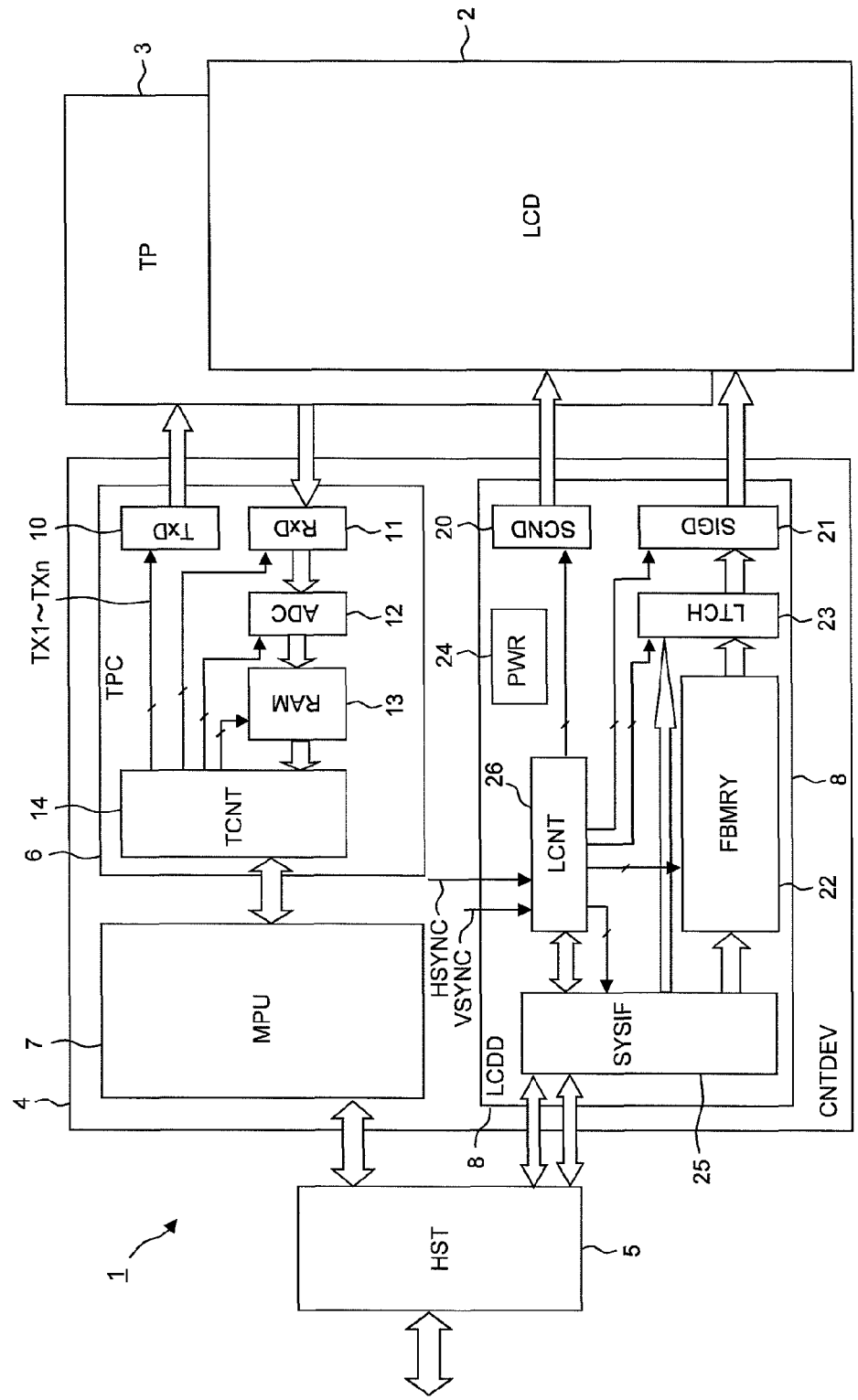
FIG. 1 is a block diagram showing, by example, a main structure of a portable information terminal device such as a tablet or a smart phone.

First, the embodiments of the invention herein disclosed will be outlined. Here, the reference numerals for reference to the drawings, which are accompanied with paired round brackets, only exemplify what the concepts of members or components referred to by the numerals contain.

[1] <Touch Panel Controller Operable to Constantly Keep a Touch-Detection Position Spaced Apart from a Display-Scan Position in Each Touch Detection Frame Cycle of 1/n of the Display Frame Cycle>

The touch panel controller (6) controls a touch panel (3) with its detection plane superposed on a display plane of a display device (2) arranged so that a display action is performed in synchronization with scan-driving of display-scan electrodes, and scan-drives an array of detection-scan electrodes of the touch panel to perform a touch detection. The touch panel controller (6) has a control part (14) which sets a detection frame cycle of the detection plane to 1/n of a display frame cycle for the display plane (n is a positive integer), and decides an order of driving the detection-scan electrodes in each detection frame cycle according to a predetermined phase-delay position and a predetermined phase-advance position with respect to a display-scan electrode drive position of the display device so as to correspond to an order of the detection-scan electrode array of the touch panel.

According to the arrangement like this, the spatial distance between a display-scan position and a touch-detection-scan position can be constantly kept at any time in each display frame cycle and consequently, the interference between a display-scan position and a touch-detection-scan position in signals can be prevented. Therefore, even with the detection frame cycle of a touch panel shorter than the display frame cycle of a display device, the coincidence between a display-scan position and a touch detection-scan position can be prevented without thinning touch detections, which is useful for increasing the accuracy of touch detection, and suppressing the reduction in the display quality of a display device. The effect and advantage as described above are ensured even in a case where detection-scan electrodes of a touch panel (or other electrodes varying in potential in line with the potential change thereon) partially double as part of display-scan electrodes of display device (or other electrodes varying in potential in line with the potential change thereon) are partially.

[2] <First Embodiment (FIG. 3) to Seventh Embodiment (FIG. 9): Drive the Detection-Scan Electrodes where Three Types of Phase Differences, i.e. Phase Differences in a Phase-Advance Direction, a Combination of a Phase-Advance Direction and a Phase-Delay Direction, and a Phase-Delay Direction Will Develop>

In the touch panel controller as described in [1], the control part decides the order of driving the detection-scan electrodes in: a first drive form for driving the detection-scan electrodes having predetermined phase differences in a phase-advance direction with respect to a display-scan electrode drive position of the display device; a second drive form for driving the detection-scan electrodes having predetermined phase differences in the phase-advance direction with respect to a display-scan electrode drive position of the display device, and the detection-scan electrodes having predetermined phase differences in a phase-delay direction with respect to a display-scan electrode drive position of the display device; and a third drive form for driving the detection-scan electrodes having predetermined phase differences in the phase-delay direction with respect to a display-scan electrode drive position of the display device.

According to the arrangement like this, a total of three drive forms, i.e. the first to third drive forms are adopted, whereby the following are made possible readily: to eliminate the need for thinning touch-detection positions in each of touch detection frame cycles arranged in one display frame cycle, and to increase the minimum value of spatial distances between a touch-detection-scan position and display-scan positions, for which all of display-scan positions are taken into account.

[3] <First Embodiment (FIG. 3): Drive the Detection-Scan Electrodes where any of the First and Second Phase Differences in the Phase-Advance or Phase-Delay Direction Will Develop with the Detection Frame Cycle Set to One Half of the Display Frame Cycle>

In the touch panel controller as described in [2], the control part sets the detection frame cycle to one half of the display frame cycle. In the first drive form, the control part drives the detection-scan electrodes having the first and second phase differences, in the phase-advance direction with respect to a display-scan electrode drive position of the display device. In the second drive form, the control part drives the detection-scan electrode having the first phase difference in the phase-advance direction with respect to a display-scan electrode drive position of the display device, and the detection-scan electrode having the first phase difference in the phase-delay direction with respect to a display-scan electrode drive position of the display device. In the third drive form, the control part drives the detection-scan electrodes having the first and second phase differences in the phase-delay direction with respect to a display-scan electrode drive position of the display device.

According to the arrangement like this, the minimum value of spatial distances between a touch-detection-scan position and display-scan positions, for which all of display-scan positions are taken into account, can be ensured to be maximized in the case of assigning two detection frame cycles to each display frame cycle.

[4] <First Embodiment (FIG. 3): Specific Phase Difference>

In the touch panel controller as described in [3], the first phase difference is one-fourth cycle, and the second phase difference is three-fourths cycle.

These are necessary and sufficient values of the phase differences in connection with the touch panel controller as described in [3].

[5] <First Embodiment (FIG. 3): Order of Driving the Detection-Scan Electrodes in the Case of Alternately Switching Between First and Second Phase Differences in Each Drive Form with the Detection Frame Cycle Set to One Half of the Display Frame Cycle>

In the touch panel controller as described in [4], the control part drives the detection-scan electrodes in the first drive form and subsequently, in the second drive form in a first half detection frame cycle of the display frame cycle. The control part drives the detection-scan electrodes in the second drive form and subsequently, in the third drive form in the latter half detection frame cycle of the display frame cycle. Assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:

$m+(k+1)/2$ when $k=1, 3, 5, 4m-1$; and
$(3m+k/2) \mod(4m)$ when $k=2, 4, 6, \ldots, 4m$.

According to the arrangement like this, a calculation for determining the driving order corresponding to the order of the array of touch panel detection-scan electrodes can be performed readily.

[6] <Sixth Embodiment (FIG. 8) and Seventh Embodiment (FIG. 9): Drive the Detection-Scan Electrodes where any of First to Fourth Phase Differences in the Phase-Advance or Phase-Delay Direction Will Develop with the Detection Frame Cycle Set to One Half of the Display Frame Cycle>

In the touch panel controller as described in [2], the control part sets the detection frame cycle to one half of the display frame cycle. In the first drive form, the control part drives the detection-scan electrodes having the first and second phase differences in the phase-advance direction with respect to a display-scan electrode drive position of the display device. In the second drive form, the control part drives: the detection-scan electrode having the first phase difference in the phase-advance direction with respect to a display-scan electrode drive position of the display device; and the detection-scan electrode having the third phase difference in the phase-delay direction with respect to a display-scan electrode drive position of the display device. In the third drive form, the control part drives the detection-scan electrodes having the third and fourth phase differences in the phase-delay direction with respect to a display-scan electrode drive position of the display device.

According to the arrangement like this, the minimum value of spatial distances between a display-scan position and a touch-detection-scan position becomes smaller than that in the embodiment as described in [3], but it becomes possible to accommodate e.g. a situation that requires a degree of freedom for setting a phase difference because of increased kinds of phase differences to be used.

[7] <Sixth Embodiment (FIG. 8): Specific Phase Difference>

In the touch panel controller as described in [6], the first phase difference is three-eighths cycle, the second phase difference is seven-eighths cycle, the third phase difference is one-eighth cycle, and the fourth phase difference is five-eighths cycle.

This makes a preferred embodiment in connection with the phase differences as described in [6].

[8] <Sixth Embodiment (FIG. 8): Order of Driving the Detection-Scan Electrodes while Sequentially Switching Among First to Fourth Phase Differences in Individual Drive Forms with the Detection Frame Cycle Set to One Half of the Display Frame Cycle>

In the touch panel controller as described in [7], the control part drives the detection-scan electrodes in the first drive form and subsequently, in the second drive form in a first half detection frame cycle of the display frame cycle. The control part drives the detection-scan electrodes in the second drive form and subsequently, in the third drive form in the latter half detection frame cycle of the display frame cycle. Assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:

$3m+(k+1)/2$ when $k=1, 3, 5, 8m-1$; and
$(7m+k/2) \mod(8m)$ when $k=2, 4, 6, 8m$.

According to the arrangement like this, a calculation for determining the driving order corresponding to the order of the array of touch panel detection-scan electrodes can be performed readily.

[9] <Seventh Embodiment (FIG. 9): Specific Phase Difference>

In the touch panel controller as described in [6], the first phase difference is one-eighth cycle, the second phase difference is five-eighths cycle, the third phase difference is three-eighths cycle, and the fourth phase difference is seven-eighths cycle.

This embodiment is reverse to the embodiment as described in [7] in the phase relations among the touch detection frame cycles in each display frame cycle, and makes a preferred embodiment in connection with the phase differences as described in [6].

[10] <Seventh Embodiment (FIG. 9): Order of Driving the Detection-Scan Electrodes while Sequentially Switching Among First to Fourth Phase Differences in Individual Drive Forms with the Detection Frame Cycle Set to One Half of the Display Frame Cycle>

In the touch panel controller as described in [9], the control part drives the detection-scan electrodes in the first drive form and subsequently, in the second drive form in a first half detection frame cycle of the display frame cycle. The control part drives the detection-scan electrodes in the second drive form and subsequently, in the third drive form in the latter half detection frame cycle of the display frame cycle. Assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:

m+(k+1)/2 when k=1, 3, 5, 8m−1; and
(5m+k/2)mod(8m) when k=2, 4, 6, 8m.

According to the arrangement like this, a calculation for determining the driving order corresponding to the order of the array of touch panel detection-scan electrodes can be performed readily.

[11] <Second Embodiment (FIG. 4): Drive the Detection-Scan Electrodes where any of First to Third Phase Differences in the Phase-Advance or Phase-Delay Direction Will Develop with the Detection Frame Cycle Set to One-Third of the Display Frame Cycle>

In the touch panel controller as described in [2], the control part sets the detection frame cycle to one-third of the display frame cycle. In the first drive form, the control part drives the detection-scan electrodes having the first to third phase differences in the phase-advance direction with respect to a display-scan electrode drive position of the display device. In the second drive form, the control part drives: the detection-scan electrodes having the first and second phase differences in the phase-advance direction with respect to a display-scan electrode drive position of the display device; and the detection-scan electrodes having the first and second phase differences in the phase-delay direction with respect to a display-scan electrode drive position of the display device. In the third drive form, the control part drives the detection-scan electrodes having the first to third phase differences in the phase-delay direction with respect to a display-scan electrode drive position of the display device.

According to the arrangement like this, the minimum value of spatial distances between a touch-detection-scan position and display-scan positions, for which all of display-scan positions are taken into account, can be ensured to be maximized in the case of assigning three detection frame cycles to each display frame cycle.

[12] <Second Embodiment (FIG. 4): Specific Phase Difference>

In the touch panel controller as described in [11], the first phase difference is one-sixth cycle, the second phase difference is three-sixths cycle, and the third phase difference is five-sixths cycle.

This makes a preferred embodiment in connection with the phase differences as described in [11].

[13] <Second Embodiment (FIG. 4): Order of Driving the Detection-Scan Electrodes while Sequentially Switching Among First to Third Phase Differences in Individual Drive Forms with the Detection Frame Cycle Set to One-Third of the Display Frame Cycle>

In the touch panel controller as described in [12], the control part drives the detection-scan electrodes in first drive form and subsequently, in the second drive form in a first detection frame cycle of the display frame cycle. The control part drives the detection-scan electrodes in the second drive form in a second detection frame cycle of the display frame cycle subsequent thereto. The control part drives the detection-scan electrodes in the second drive form and subsequently, in the third drive form in a third detection frame cycle of the display frame cycle. Assuming that 6m detection-scan electrodes numbered 1 to 6m (m is a positive integer) are driven in each detection frame cycle, the k-th detection-scan electrode to be driven (k is a natural number up to 6m) in the order of driving the detection-scan electrodes in each detection frame cycle, corresponding to the order of the detection-scan electrode array, has an array number given by:

m+(k+2)/3 when k=1, 4, 7, . . . , 6m−2;
3m+(k+1)/3 when k=2, 5, 8, 6m−1; and
(5m+k/3)mod(6m) when k=3, 6, 9, . . . , 6m.

According to the arrangement like this, a calculation for determining the driving order corresponding to the order of the array of touch panel detection-scan electrodes can be performed readily.

[14] <Third Embodiment (FIG. 5): Drive the Detection-Scan Electrodes where any of First to Fourth Phase Differences in the Phase-Advance or Phase-Delay Direction Will Develop with the Detection Frame Cycle Set to One-Fourth of the Display Frame Cycle>

In the touch panel controller as described in [2], the control part sets the detection frame cycle to one-fourth of the display frame cycle. In the first drive form, the control part drives the detection-scan electrodes having the first to fourth phase differences in the phase-advance direction with respect to a display-scan electrode drive position of the display device. In the second drive form, the control part drives the detection-scan electrodes having the first to third phase differences in the phase-advance direction with respect to a display-scan electrode drive position of the display device, and the detection-scan electrodes having the first to third phase differences in the phase-delay direction with respect to a display-scan electrode drive position of the display device. In the third drive form, the control part drives the detection-scan electrodes having the first to fourth phase differences in the phase-delay direction with respect to a display-scan electrode drive position of the display device.

According to the arrangement like this, the minimum value of spatial distances between a touch-detection-scan position and display-scan positions, for which all of display-scan positions are taken into account, can be ensured to be maximized in the case of assigning four detection frame cycles to each display frame cycle.

[15] <Third Embodiment (FIG. 5): Specific Phase Difference>

In the touch panel controller as described in [14], the first phase difference is one-eighth cycle, the second phase difference is three-eighths cycle, the third phase difference is five-eighths cycle, and the fourth phase difference is seven-eighths cycle.

This makes a preferred embodiment in connection with the phase differences as described in [14].

[16] <Third Embodiment (FIG. 5): Order of Driving the Detection-Scan Electrodes while Sequentially Switching Among First to Fourth Phase Differences in Individual Drive Forms with the Detection Frame Cycle Set to One-Fourth of the Display Frame Cycle>

In the touch panel controller as described in [15], the control part drives the detection-scan electrodes in first drive form and subsequently, in the second drive form in a first detection frame cycle of the display frame cycle. The control part drives the detection-scan electrodes in the second drive form in second to third detection frame cycles of the display frame cycle. The control part drives the detection-scan electrodes in the second drive form and subsequently, in the third drive form in a fourth detection frame cycle of the display frame cycle. Assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:

m+(k+3)/4 when k=1, 5, 9, 8m−3;
3m+(k+2)/4 when k=2, 6, 10, . . . , 8m−2;
5m+(k+1)/4 when k=3, 7, 11, . . . , 8m−1; and
(7m+k/4)mod(8m) when k=4, 8, 12, . . . , 8m.

According to the arrangement like this, a calculation for determining the driving order corresponding to the order of the array of touch panel detection-scan electrodes can be performed readily.

[17] <Fourth Embodiment (FIG. 6) and Fifth Embodiment (FIG. 7): Drive the Detection-Scan Electrodes where any of the First Phase Difference and a Phase Difference in the Vicinity Thereof, and the Second Phase Difference and a Phase Difference in the Vicinity Thereof in the Phase-Advance or Phase-Delay Direction Will Develop with the Detection Frame Cycle Set to One Half of the Display Frame Cycle>

In the touch panel controller as described in [2], the control part sets the detection frame cycle to one half of the display frame cycle. In the first drive form, the control part drives the detection-scan electrodes having the first phase difference and a phase difference in the vicinity thereof, and the second phase difference and a phase difference in the vicinity thereof in the phase-advance direction with respect to a display-scan electrode drive position of the display device. In the second drive form, the control part drives: the detection-scan electrodes having the first phase difference and a phase difference in the vicinity thereof in the phase-advance direction with respect to a display-scan electrode drive position of the display device; and the detection-scan electrodes having the first phase difference and a phase difference in the vicinity thereof in the phase-delay direction with respect to a display-scan electrode drive position of the display device. In the third drive form, the control part drives the detection-scan electrodes having the first phase difference and a phase difference in the vicinity thereof, and the second phase difference and a phase difference in the vicinity thereof in the phase-delay direction with respect to a display-scan electrode drive position of the display device.

The arrangement like this brings about, by means of the switching to a phase difference in the vicinity of the latest phase difference, the same effect and advantage without the need for widely switching the phase of the detection-scan electrode of the touch panel each time the display-scan electrode is switched as performed in the embodiment as described in [3]. It is noted that in the fourth embodiment, with two detection frame cycles assigned to each display frame cycle, the minimum value of spatial distances between a touch-detection-scan position and display-scan positions, for which all of display-scan positions are taken into account, is smaller than that in the first embodiment as described in [3].

[18] <Fourth Embodiment (FIG. 6) and Fifth Embodiment (FIG. 7): Specific Phase Difference>

In the touch panel controller as described in [17], the first phase difference is one-fourth cycle, and the second phase difference is three-fourths cycle.

This makes a preferred embodiment in connection with the phase differences as described in [17].

[19] <Fourth Embodiment (FIG. 6): Order of Driving the Detection-Scan Electrodes in Each Drive Form with the Detection Frame Cycle Set to One Half of the Display Frame Cycle in the Case of Using One Phase Difference in the Vicinity of the First Phase Difference, and One Phase Difference in the Vicinity of the Second Phase Difference>

In the touch panel controller as described in [18], the control part drives the detection-scan electrodes in the first drive form and subsequently, in the second drive form in a first half detection frame cycle of the display frame cycle. The control part drives the detection-scan electrodes in the second drive form and subsequently, in the third drive form in the latter half detection frame cycle of the display frame cycle. Assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:

m+(k+1)/2 when k=1, 5, 9, . . . , 4m−3;
(3m+k/2)mod(4m) when k=2, 6, 10, 4m−2;
{3m+(k+1)/2} mod(4m) when k=3, 7, 11, . . . , 4m−1; and
m+k/2 when k=4, 8, 12, . . . , 4m.

According to the arrangement like this, a calculation for determining the driving order corresponding to the order of the array of touch panel detection-scan electrodes can be performed readily.

[20] <Fifth Embodiment (FIG. 7): Order of Driving the Detection-Scan Electrodes in Each Drive Form with the Detection Frame Cycle Set to One Half of the Display Frame Cycle in the Case of Using Two Phase Differences in the Vicinity of the First Phase Difference, and Two Phase Differences in the Vicinity of the Second Phase Difference>

In the touch panel controller as described in [18], the control part drives the detection-scan electrodes in the first drive form and subsequently, in the second drive form in a first half detection frame cycle of the display frame cycle. The control part drives the detection-scan electrodes in the second drive form and subsequently, in the third drive form in the latter half detection frame cycle of the display frame cycle. Assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:

m+(k+1)/2 when k=1, 7, 13, . . . , 4m−5;
(3m+k/2)mod(4m) when k=2, 8, 14, . . . , 4m−4;
{3m+(k+1)/2} mod(4m) when k=3, 9, 15, . . . , 4m−3;
{3m+(k+3)/2} mod(4m) when k=4, 10, 16, . . . , 4m−2;
m+(k−1)/2 when k=5, 11, 15, . . . , 4m−1; and
m+k/2 when k=6, 12, 16, . . . , 4m.

According to the arrangement like this, a calculation for determining the driving order corresponding to the order of the array of touch panel detection-scan electrodes can be performed readily.

[21] <Semiconductor Device Arranged so as to Keep a Touch-Detection Position and a Display-Scan Position Spaced Apart from Each Other at all Times in Each Touch Detection Frame Cycle of 1/n of the Display Frame Cycle>

The semiconductor device (4) has: a display controller (8) which performs the display control of a display device (2) in synchronization with a frame synchronizing signal; and a touch panel controller which activates a touch panel (2) having a detection plane superposed on a display plane of the display device to perform a touch detection. The touch panel controller (6) sets a detection frame cycle of the detection plane to 1/n (n is a positive integer) of a display frame cycle according to the frame synchronizing signal to the display plane, and decides an order of driving the detection-scan electrodes in each detection frame cycle according to a predetermined phase-delay position and a predetermined phase-advance position with respect to a display-scan electrode drive position of the display device so as to correspond to an order of the detection-scan electrode array of the touch panel.

According to the arrangement like this, the spatial distance between a display-scan position and a touch-detection-scan position can be constantly kept at any time in each display frame cycle and consequently, the interference between a display-scan position and a touch detection-scan position in signals can be prevented. Therefore, even with the detection frame cycle of a touch panel shorter than the display frame cycle of a display device, the coincidence between a display-scan position and a touch detection-scan position can be prevented without thinning touch detections, which is useful for increasing the accuracy of touch detection, and suppressing the reduction in the display quality of a display device. The effect and advantage as described above are ensured even in a case where detection-scan electrodes of a touch panel (or other electrodes varying in potential in line with the potential change thereon) partially double as part of display-scan electrodes of a display device (or other electrodes varying in potential in line with the potential change thereon) are partially.

[22] <First Embodiment (FIG. 3) to Seventh Embodiment (FIG. 9): Drive the Detection-Scan Electrodes where Three Types of Phase Differences, i.e. Phase Differences in a Phase-Advance Direction, a Combination of a Phase-Advance Direction and a Phase-Delay Direction, and a Phase-Delay Direction Will Develop>

In the touch panel controller as described in [21], the touch panel controller decides the order of driving the detection-scan electrodes in: a first drive form for driving the detection-scan electrodes having predetermined phase differences in a phase-advance direction with respect to a display-scan electrode drive position of the display device; a second drive form for driving the detection-scan electrodes having predetermined phase differences in the phase-advance direction with respect to a display-scan electrode drive position of the display device, and the detection-scan electrodes having predetermined phase differences in a phase-delay direction with respect to a display-scan electrode drive position of the display device; and a third drive form for driving the detection-scan electrodes having predetermined phase differences in the phase-delay direction with respect to a display-scan electrode drive position of the display device.

According to the arrangement like this, a total of three drive forms, i.e. the first to third drive forms are adopted, whereby the following are made possible readily: to eliminate the need for thinning touch-detection positions in each of touch detection frame cycles arranged in one display frame cycle, and to increase the minimum value of spatial distances between a touch-detection position and display-scan positions, for which all of display-scan positions are taken into account.

2. Further Detailed Description of the Embodiments

The embodiments will be described further in detail.

<<Portable Information Terminal Device>>

FIG. 1 shows, by example, a main structure of a portable information terminal device such as a tablet or a smart phone. The portable information terminal device 1 shown in the drawing has, on a surface of a housing thereof, a dot-matrix display device, e.g. a liquid crystal panel (LCD) 2, and a touch panel (TP) 3 which allows the touch detection based on the mutual capacitance technique. The touch panel 3 overlies the liquid crystal panel 2; the detection plane of the touch panel 3 is put on the display plane of the liquid crystal panel 2. Although no special restriction is intended, the structure in which the detection plane of the touch panel 3 is put on the display plane of the liquid crystal panel 2 may be any of an external attachment structure, an integrated in-cell structure, and the like.

While not particularly shown in the drawing, the liquid crystal panel 2 has e.g. a thin-film transistor referred to as "TFT" at each intersection point of display-scan electrodes and display-signal electrodes arranged to intersect with one another; thin-film transistors each have a gate connected to the display-scan electrode, and a source connected to the display-signal electrode e, and a drain connected to a common electrode through a liquid crystal element and a storage capacitor which constitute a sub-pixel, and each form a pixel. In display control, the display-scan electrodes are driven sequentially, the thin-film transistors are turned ON for each display-scan electrode, and thus current is caused to flow between the source and drain of TFTs concerned. The signal voltages supplied through the display-signal electrodes to the sources of TFTs at this time are applied to the liquid crystal elements, whereby the liquid crystal panel is controlled in gradation.

While not particularly shown in the drawing, the mutual capacitance type touch panel 3 supporting multipoint touch has a number of detection capacitances formed at the points where detection-scan electrodes and detection signal electrodes intersect with one another like a matrix, for example. While the detection-scan electrodes are driven sequentially, the touch panel integrates potential changes arising on the detection signal electrodes through the detection capacitances to form detection signals. Incase that a finger is brought close to the detection capacitances, the stray capacitance of the finger is combined with the detection capacitances, and thus the combined capacitance values become smaller. The mutual capacitance type touch panel is arranged to discriminate between the states of "being touched" and "being untouched" based on the differences of the detection signals according to the changes of the capacitance values.

Because of using the touch panel 3 superposed on the liquid crystal panel 2, the operation performed can be determined from touch coordinates subjected to a multipoint touch conducted on the touch panel 3 according to display on a screen of the liquid crystal panel 2. The control and the arithmetic calculation process therefor are performed by the controller device (CNTDEV) 4 and the host processor (HST) 5. Although no special restriction is intended, a portable information terminal device is formed by connecting the host processor 5 with a communication control unit, an imageprocessing unit, an audio-processing unit, and other devices including an accelerator, which are not shown in the drawing.

In the device shown in FIG. 1, the liquid crystal panel 2 and the touch panel 3 are controlled by e.g. the controller device 4. Although no special restriction is intended, the controller device 4 has a touch panel controller (TPC) 6, a subprocessor (MPU) 7, and a liquid crystal driver (LCDD) 8 serving as a display controller, and is formed in one semiconductor substrate of monocrystalline silicon or the like by means of CMOS IC manufacturing technique.

The touch panel controller 6 activates the touch panel 3 to perform a touch detection. The subprocessor 7 provides an instruction about an action to the touch panel controller 6 according to a command provided by the host processor (HST) 5, and performs a coordinate calculation of a touch position while using detection data which the touch panel controller 6 has taken from the touch panel 3. The host processor (HMPU) 5 creates display data. The liquid crystal driver 8 performs the display control for displaying, on the liquid crystal panel 2, the display data provided by the host processor 5. In case that the touch panel 3 is being touched, the host processor 5 takes position coordinate data from the subprocessor 7, and analyzes an input resulting from an operation on the touch panel 3 based on the relation between the position coordinate data and a frame of display image provided to and displayed by the liquid crystal driver 8.

<<Liquid Crystal Driver>>

As shown in FIG. 1, the liquid crystal driver 8 has e.g. a scan-drive circuit (SCND) 20, a gradation-drive circuit (SIGD) 21, a frame buffer memory (FBMRY) 22, a line latch circuit (LTCH) 23, a power supply circuit 24, a system interface circuit (SYSIF) 25, and a display control circuit (LCNT) 26 operable to perform the overall control of the liquid crystal driver 8. The liquid crystal driver 8 performs the display control of the liquid crystal panel 2 in synchronization with the frame synchronizing signal. In FIG. 1, a vertical synchronizing signal VSYNC serves as the frame synchronizing signal, for example. Although no special restriction is intended, the vertical synchronizing signal VSYNC and the horizontal synchronizing signal HSYNC are supplied to the display control circuit 26 from outside the controller device 4.

The system interface 25 receives a display command and display data from the host processor 5. The received display data are directly forwarded to the line latch circuit 23 in synchronization with the display timing, or drawn on the frame buffer memory 22 by the display frame and then forwarded to the line latch circuit 23 by the display line according to the display form thereof.

The forwarding of display data to the line latch circuit 23 is performed in each horizontal scan period arranged in synchronization with the horizontal synchronizing signal HSYNC. The gradation-drive circuit 21 outputs gradation voltages to the display-signal electrodes of the liquid crystal panel 2 according to display data latched by the line latch circuit 23 in parallel. The scan-drive circuit 20 sequentially drives the display-scan electrodes of the liquid crystal panel 2 in synchronization with the horizontal synchronizing signal HSYNC in each frame cycle. In this way, the thin-film transistors are turned ON in units of display-scan electrodes, whereby current is caused to flow between the sources and drains thereof; at this time, the gradation-drive circuit 21 applies signal voltages as gradation voltages to the sources and therefore to the liquid crystal elements through the display-signal electrodes based on display data latched by the line latch circuit 23 in each horizontal scan period. Thus, the liquid crystal elements are driven in units of display lines synchronized with sequential scan and drive of the display-scan electrodes by the frame cycle according to gradation data. A gradation voltage output by the gradation-drive circuit 21, an operation-drive voltage output by the scan-drive circuit 20, and the like are generated by the power supply circuit 24. According to a display command provided by the host processor 5, the display control circuit 26 performs the overall control of the liquid crystal driver 8 which includes the display control as described above.

<<Touch Panel Controller>>

As shown in FIG. 1, the touch panel controller 6 has e.g. a drive circuit (TxD) 10, a detection circuit (RxD) 11, an analog-to-digital conversion circuit (ADC) 12, RAM 13 and a touch-control circuit (TCNT) 14. The drive circuit 10 outputs a drive pulse to detection-scan electrodes of the touch panel 3 sequentially. A voltage change developed on each detection signal electrode through a detection capacitance connected with the driven detection-scan electrode is accumulated by an integration circuit of the detection circuit 11. In this way, a detection signal is formed for each detection signal electrode. The detection signal which is an analog signal is converted into a digital signal by ADC 12. The resultant digital signal is accumulated by RAM 13 as detection data. The touch-control circuit 14 controls the order in which the drive circuit 10 drives the detection-scan electrodes, and the drive timing thereof, and controls, in synchronization with the drive timing, the action timings of the detection circuit 11 and ADC 12 and the writing action on RAM 13. The detection data obtained by the drive and scan of the detection-scan electrodes for the whole screen of touch panel 3, and the detecting action on the whole screen, i.e. the scan and drive and the detecting action on the touch panel 3 for each frame are accumulated by RAM 13. Then, the touch-control circuit 14 determines whether the touch panel is being touched or not from the detection data, calculates the position coordinate of a touch position in the touch panel 2, and provides a result of the calculation to the host processor 5.

In a low-profile structure having a liquid crystal panel 2 and a touch panel 3 integrated into a single unit, electrodes of the touch panel 3 are arranged, in part, to double as the electrodes of the liquid crystal panel 2, or the touch panel electrodes are disposed close to the liquid crystal panel electrodes. For instance, in-cell structures include a structure in which the detection-scan electrodes of a touch panel 3 (or other electrodes which are changed in potential in line with them) are commonly used as part of display-scan electrodes of a liquid crystal panel 2 (or other electrodes which are changed in potential in line with them). As a concrete example thereof, a structure in which the common electrode of a liquid crystal panel 2 is, in part, arranged to double as detection-scan electrodes of a touch panel 3 can be taken. In this case, the drain of TFT element selected by the display-scan electrode is connected to the common electrode assigned to display-scan electrode of the liquid crystal panel. Therefore, in case that the drive timing of the display-scan electrodes competes with the drive timing of the common electrode assigned to the display-scan electrode and working as a detection-drive electrode of the touch panel, a predetermined drain voltage will be changed at the time of display-scan driving in the liquid crystal panel 2, which produces an error in the gradient of the liquid crystal elements having received gradation voltages and thus causing the distortion of display. In contrast, in the touch panel, the potential of the detection-scan electrode making the common electrode is influenced through the TFT element at the time of detection-scan driving and consequently an error is produced in the electric charge accumulated in the detection capacitance, which is a cause of the decrease in the accuracy of touch detection. This kind of noise is caused by not only the sharing of part of electrodes by the touch panel 3 and the liquid crystal panel 2. It is produced by the interference between electrodes located close to each other as well.

Hence, the detection frame cycle of the detection plane of the touch panel 3 (e.g. the detection cycle during which one round of the driving of the detection-scan electrodes of the touch panel is completed) is set to be a cycle of 1/n (n is a positive integer) of a display frame cycle for the display plane of the liquid crystal panel 2 (e.g. the cycle of the vertical synchronizing signal VSYNC during which one round of the driving of the display-scan electrodes is completed). Adopted for the touch-control circuit 14 of the touch panel controller 6 in this time is a control logic for deciding the order of driving the detection-scan electrodes in each detection frame cycle according to a predetermined phase-delay position and a predetermined phase-advance position with respect to a display-scan electrode drive position of the liquid crystal panel 2 corresponding to the order of the detection-scan electrode array of the touch panel 3. One of the features of the control logic is that the order of driving the detection-scan electrodes in the touch panel 3 is decided by first to third drive forms. The first drive form is for driving the detection-scan electrodes having predetermined phase differences in a phase-advance direction with respect to a display-scan electrode drive position of the liquid crystal panel 2. The second drive form is for driving the detection-scan electrodes having predetermined phase differences in a phase-delay direction in a phase-advance direction with respect to a display-scan electrode drive position of the liquid crystal panel 2. The third drive form is for driving the detection-scan electrodes having predetermined phase differences in the phase-delay direction with respect to a display-scan electrode drive position of the liquid crystal panel 2.

Figure 2:
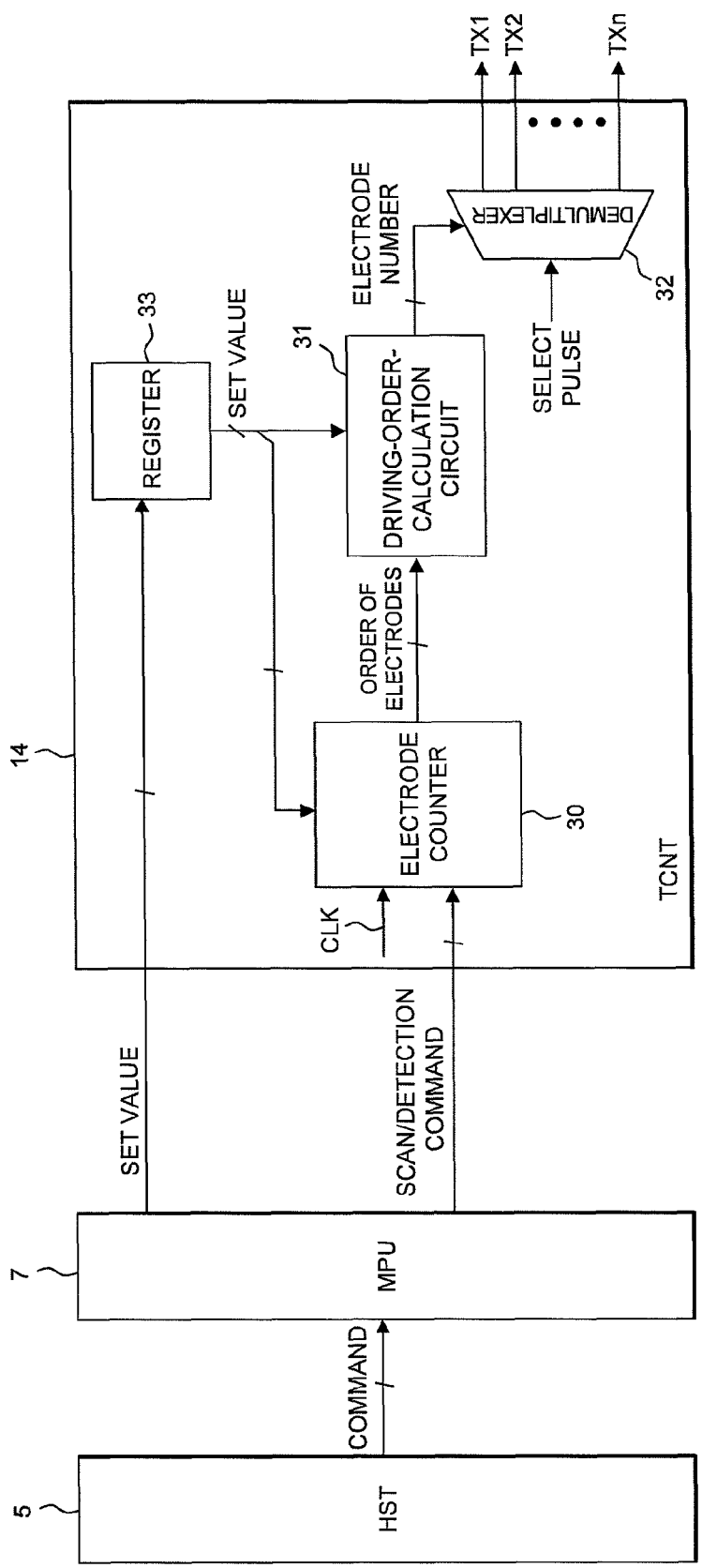
FIG. 2 is a block diagram showing, by example, a general structure of a control logic which decides the order of driving detection-scan electrodes.

FIG. 2 shows, by example, a general structure of a control logic which decides the order of driving the detection-scan electrodes. The driving-order-decision control logic shown in the drawing has e.g. an electrode counter 30, a driving-order-calculation circuit 31, a demultiplexer 32, and a register 33. The subprocessor 7 rewritably sets, on the register 33, a ratio of a display frame cycle to a detection frame cycle (or a ratio of a display-action speed to detecting action speed), a phase difference between the drive timing of the detection-scan electrode and the drive timing of the display-scan electrode, and the number of the detection-scan electrodes to be driven, and a combination of the direction of selecting the detection-scan electrodes and the electrode number of the detection-scan electrode to start the selection with, etc. On the electrode counter 30, the number of detection-scan electrodes to be driven, which has been put in the register 33, is preset. The electrode counter 30 starts counting a clock signal CLK following an instruction received through a detection/scan command, and counts up in a range from an initial value of one (1) to the preset value according to the wrap-around method. The driving-order-calculation circuit 31 has a calculation logic which accepts, as inputs of calculation parameters, values set on the register 33 and a count value of the counter 30, and which calculates, based on the input count value, an electrode number assigned to the detection-scan electrode to be driven. The demultiplexer 32 forms a select signal for selecting the detection-scan electrode having the calculated electrode number. TX1 to TXn each represent a select signal of the detection-scan electrode. The select signals X1 to TXn of the detection-scan electrodes are provided to the drive circuit 10, and then the appropriate detection-scan electrode is driven by a pulse. Thus, the scan-drive electrodes of the touch panel 3 can be driven in a desired electrode number order according to the calculation logic of the driving-order-calculation circuit 31. The calculation logic of the driving-order-calculation circuit 31 will be concretely described below.

<<First Embodiment of the Driving-Order-Calculation Logic>>

In the calculation logic according to the first embodiment, the detection frame cycle is one half of the display frame cycle, and the detection-scan electrodes where any of first and second phase differences will develop in the phase-advance and phase-delay directions are driven.

Figure 3:
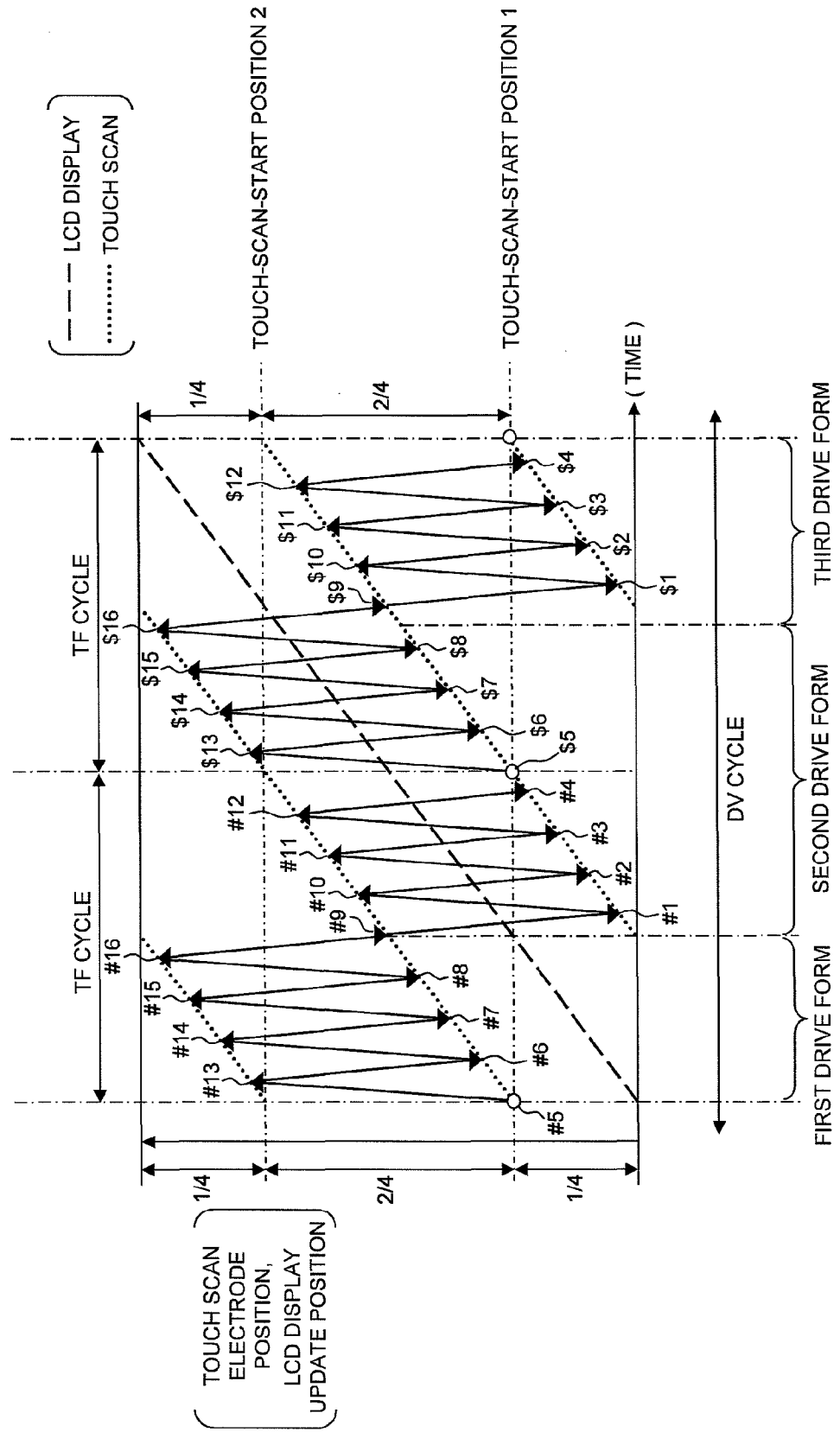
FIG. 3 is an explanatory diagram showing, by example, the order of driving scan-drive electrodes according to the first embodiment of a driving-order-calculation logic.

FIG. 3 shows, by example, the order of driving the scan-drive electrodes according to the first embodiment of the driving-order-calculation logic. Here, the case of performing a touch detection (touch scan) with two detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by one-fourth of one display frame cycle (a phase representing one-fourth picture frame of the display plane), delayed by a phase representing one-fourth picture frame, delayed by a phase representing three-fourths picture frame, or advanced by a phase representing three-fourths picture frame are selectively driven with one half cycle of mutual phase difference, whereby the driving of the detection-scan electrodes is controlled so as to be able to keep a display-scan-drive position and a touch-scan position (detection-scan-drive position) spaced apart from each other by a phase representing about one-fourth picture frame at all times.

Further in detail, in the driving-order-calculation logic, the detection frame cycle is one half of one display frame cycle. In FIG. 3, it is assumed that the touch panel 3 has 16 detection-scan electrodes, the electrode numbers of which are 1 to 16 in the array order of the electrodes. In the first half detection frame cycle TF in one display frame cycle DV, the electrode numbers are denoted by #1 to #16 for the sake of convenience; in the second detection frame cycle TF, the electrode numbers are denoted by $1 to $16 for the sake of convenience. The reason for using the denotation like this is it is intended to allow the discrimination of the electrode numbers between first and second detection frame cycles.

In the first drive form according to the first embodiment, the following are driven: the detection-scan electrodes #5 to #8 having the first phase difference (one-fourth cycle); and the detection-scan electrodes #13 to #16 having the second phase difference (three-fourth cycle), provided that both the phase differences arise in the phase-advance direction with respect to a display-scan electrode drive position of the liquid crystal panel 2. In the second drive form, the following are driven: the detection-scan electrodes #9 to #12 and $13 to $16 having the first phase difference (one-fourth cycle) in the phase-advance direction with respect to a display-scan electrode drive position of the liquid crystal panel 2; and the detection-scan electrodes #1 to #4 and $5 to $8 having the first phase difference (one-fourth cycle) in the phase-delay direction with respect to a display-scan electrode drive position of the liquid crystal panel 2. In the third drive form, the following are driven: the detection-scan electrodes $9 to $12 having the first phase difference (one-fourth cycle); and the detection-scan electrodes $1 to $4 having the second phase difference (three-fourth cycle), provided that both the phase differences arise in the phase-delay direction with respect to a display-scan electrode drive position of the liquid crystal panel 2.

According to the arrangement like this, the minimum value of spatial distances between a touch-detection-scan position and display-scan positions, for which all of display-scan positions are taken into account, can be ensured to be maximized in the case of assigning two detection frame cycles to each display frame cycle. In short, such spatial distances can be ensured anywhere to be one-fourth cycle.

In the first embodiment, the driving-order-calculation circuit 31 drives the detection-scan electrodes in the first drive form and subsequently, in the second drive form in the first half detection frame cycle of one display frame cycle. In the latter half detection frame cycle of the display frame cycle, the detection-scan electrodes are driven in the third drive form and subsequently, in the second drive form. The order of driving the detection-scan electrodes in each detection frame cycle, which corresponds to the array order of the detection-scan electrodes, is determined as follows. Assuming that 4m detection-scan electrodes having array numbers 1 to 4m (m is a positive integer) are driven in each detection frame cycle, the electrode number tx (representing each of signal numbers 1 to n of select signals TX1 to TXn) of the k-th (first to 4m-th) detection-scan electrode to be driven is given by:

m+(k+1)/2 when k=1, 3, 5, 4m−1; and
(3m+k/2)mod (4m) when k=2, 4, 6, . . . , 4m. (See Formula Group 1.)

Formula Group 1

$$TX_{m+\frac{k+1}{2}} \quad \text{:when } k = 1, 3, 5, \ldots, 4m-1 \quad (i)$$

$$TX_{\left(3m+\frac{k}{2}\right)mod(4m)} \quad \text{:when } k = 2, 4, 6, \ldots, 4m \quad (ii)$$

The formula group applies to the case of m=4 in the embodiment described with reference to FIG. 3, and the electrode number tx of the detection-scan electrode selected for a driving turn k of the detection-scan electrode in each detection frame cycle is, as shown in the drawing, 5, 13, 6, 14, 7, 15, 8, 16, 1, 9, 2, 10, 3, 11, 4, 12 in turn.

According to the arrangement like this, a calculation for determining the driving order corresponding to the order of the array of touch panel detection-scan electrodes can be performed readily.

According to the first embodiment of the driving-order-calculation logic, the order of driving the electrodes for touch scan can be set to be a required order on condition that two touch frame cycles are arranged in each display frame cycle. The touch scan can be performed on one electrode which is distant from an electrode a liquid crystal panel 2 in use for overwrite at all times, and thus the interference with display can be suppressed. Therefore, the following are made possible: to eliminate the distortion of display owing to the arrangement of an electrode commonly used for both touch scan and the display overwrite of the liquid crystal panel 2; and to reduce the interference with a result of touch scan owing to the overwrite on liquid crystal panel 2.

<<Second Embodiment of the Driving-Order-Calculation Logic>>

In the calculation logic according to the second embodiment, the detection frame cycle is one-third of the display frame cycle, and the detection-scan electrodes where any of first to third phase differences in the phase-advance and phase-delay directions will develop are driven.

Figure 4:
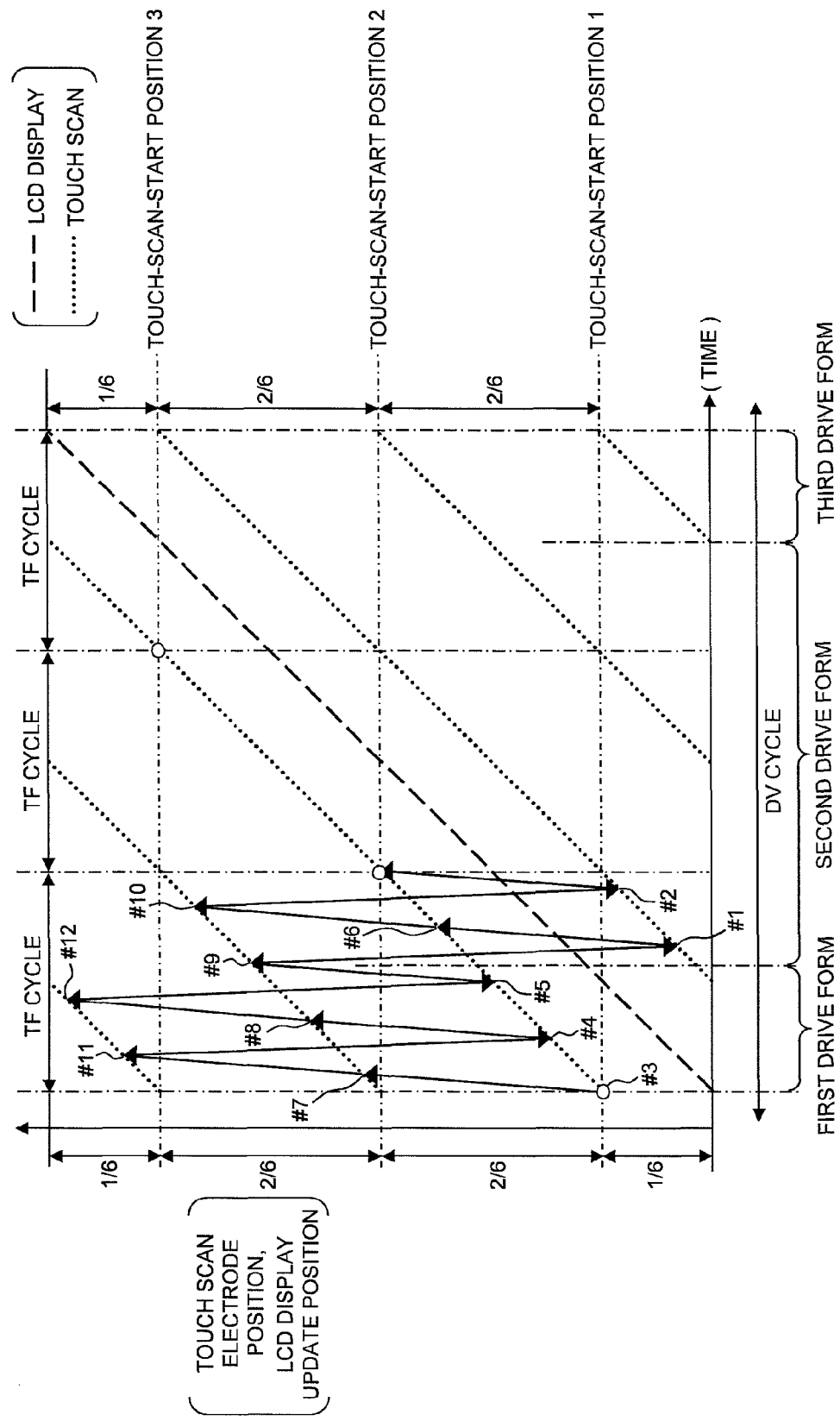
FIG. 4 is an explanatory diagram showing, by example, the order of driving the scan-drive electrodes according to the second embodiment of the driving-order-calculation logic.

FIG. 4 shows, by example, the order of driving the scan-drive electrodes according to the second embodiment of the driving-order-calculation logic. Here, the case of performing a touch detection (touch scan) with three detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by one-sixth of one display frame cycle (a phase representing one-sixth picture frame of the display plane), delayed by a phase representing one-sixth picture frame, advanced by three-sixths cycle (a phase representing three-sixths picture frame of the display plane), delayed by a phase representing three-sixths picture frame, advanced by five-sixths cycle (a phase representing five-sixths picture frame of the display plane), or delayed by a phase representing five-sixths picture frame are selectively driven with one-third cycle of mutual phase difference, whereby the driving of the detection-scan electrodes is controlled so as to be able to keep a display-scan-drive position and a touch-scan position (detection-scan-drive position) spaced apart from each other by a phase representing no less than about one-sixth picture frame at all times.

Further in detail, in the driving-order-calculation logic, the detection frame cycle is one-third of one display frame cycle. In FIG. 4, it is assumed that the touch panel 3 has 12 detection-scan electrodes, the electrode numbers of which are 1 to 12 in the array order of the electrodes. In the first detection frame cycle TF in one display frame cycle DV, the electrode numbers are denoted by #1 to #12 for the sake of convenience. As to the subsequent detection frame cycles, the electrodes' positions and numbers are not shown in the drawing.

In the first drive form according to the second embodiment, the following are driven: the detection-scan electrodes #3 to #5 having the first phase difference (one-sixth cycle); the detection-scan electrodes #7 and #8 having the second phase difference (three-sixths cycle); and the detection-scan electrodes #11 and #12 having the third phase difference (five-sixths cycle), provided that the first to third phase differences arise in the phase-advance direction with respect to a display-scan electrode drive position of the liquid crystal panel 2. In the second drive form, the following are driven: the detection-scan electrodes #6, etc. having the first phase difference (one-sixth cycle), and the detection-scan electrodes #9, #10, etc. having the second phase difference (three-sixths cycle), provided that the phase differences arise in the phase-advance direction with respect to a display-scan electrode drive position of the liquid crystal panel 2; and the detection-scan electrodes #1 and #2 having the first phase difference (one-sixth cycle), and the detection-scan electrodes having the second phase difference (three-sixths cycle), provided that the phase differences arise in the phase-delay direction with respect to a display-scan electrode drive position of the liquid crystal panel 2. In the third drive form, the following are driven: the detection-scan electrodes having the first phase difference (one-sixth cycle); the detection-scan electrodes having the second phase difference (three-sixths cycle); and the detection-scan electrodes having the third phase difference (five-sixths cycle), provided that the first to third phase differences arise in the phase-delay direction with respect to a display-scan electrode drive position of the liquid crystal panel 2.

According to the arrangement like this, the minimum value of spatial distances between a touch-detection-scan position and display-scan positions, for which all of display-scan positions are taken into account, can be ensured to be maximized in the case of assigning three detection frame cycles to each display frame cycle. In short, such spatial distances can be ensured anywhere to be no less than one-sixth cycle.

In the second embodiment, the driving-order-calculation circuit 31 drives the detection-scan electrodes in the first drive form and subsequently, in the second drive form in the first detection frame cycle (first TF cycle) of the display frame cycle (DV cycle). In the second detection frame cycle subsequent to the display frame cycle, the driving-order-calculation circuit 31 drives the detection-scan electrodes in the second drive form. In the third detection frame cycle of the display frame cycle, the driving-order-calculation circuit 31 drives the detection-scan electrodes in the second drive form and subsequently, in the third drive form. The order of driving the detection-scan electrodes corresponding to the array order of the detection-scan electrodes in each detection frame cycle is determined as follows. Assuming that 6m detection-scan electrodes having array numbers 1 to 6m (m is a positive integer) are driven in each detection frame cycle, the electrode number tx (representing each of signal numbers 1 to n of select signals TX1 to TXn) of the detection-scan electrode to be driven at the k-th (k is a natural number up to 6m) turn is given by:

m+(k+2)/3 when k=1, 4, 7, . . . , 6m−2;
3m+(k+1)/3 when k=2, 5, 8, . . . , 6m−1;
(5m+k/3)mod(6m) when k=3, 6, 9, . . . , 6m. (See Formula Group 2.)

Formula Group 2

$$TX_{m+\frac{k+2}{3}} \quad \text{:when } k = 1, 4, 7, \ldots, 6m - 2 \quad (i)$$

$$TX_{\left(3m+\frac{k+1}{3}\right)} \quad \text{:when } k = 2, 5, \ldots, 6m - 1 \quad (ii)$$

$$TX_{\left(5m+\frac{k}{3}\right)\mathrm{mod}(6m)} \quad \text{:when } k = 3, 6, 9, \ldots, 6m \quad (iii)$$

The Formula Group 2 applies to the case of m=2 in the embodiment described with reference to FIG. 4.

According to the arrangement like this, a calculation for determining the driving order corresponding to the order of the array of touch panel detection-scan electrodes can be performed readily.

According to the second embodiment of the driving-order-calculation logic, the order of driving the electrodes for touch scan can be set to be a required order on condition that three touch frame cycles are arranged in each display frame cycle. The touch scan can be performed on one electrode which is distant from an electrode a liquid crystal panel 2 in use for overwrite at all times, and thus the interference with display can be suppressed. Therefore, the following are made possible: to eliminate the distortion of display owing to the arrangement of an electrode commonly used for both touch scan and the display overwrite of the liquid crystal panel 2; and to reduce the interference with a result of touch scan owing to the overwrite on liquid crystal panel 2.

<<Third Embodiment of the Driving-Order-Calculation Logic>>

In the calculation logic according to the third embodiment, the detection frame cycle is one-fourth of the display frame cycle, and the detection-scan electrodes where any of first to fourth phase differences in the phase-advance or phase-delay direction will develop are driven.

Figure 5:
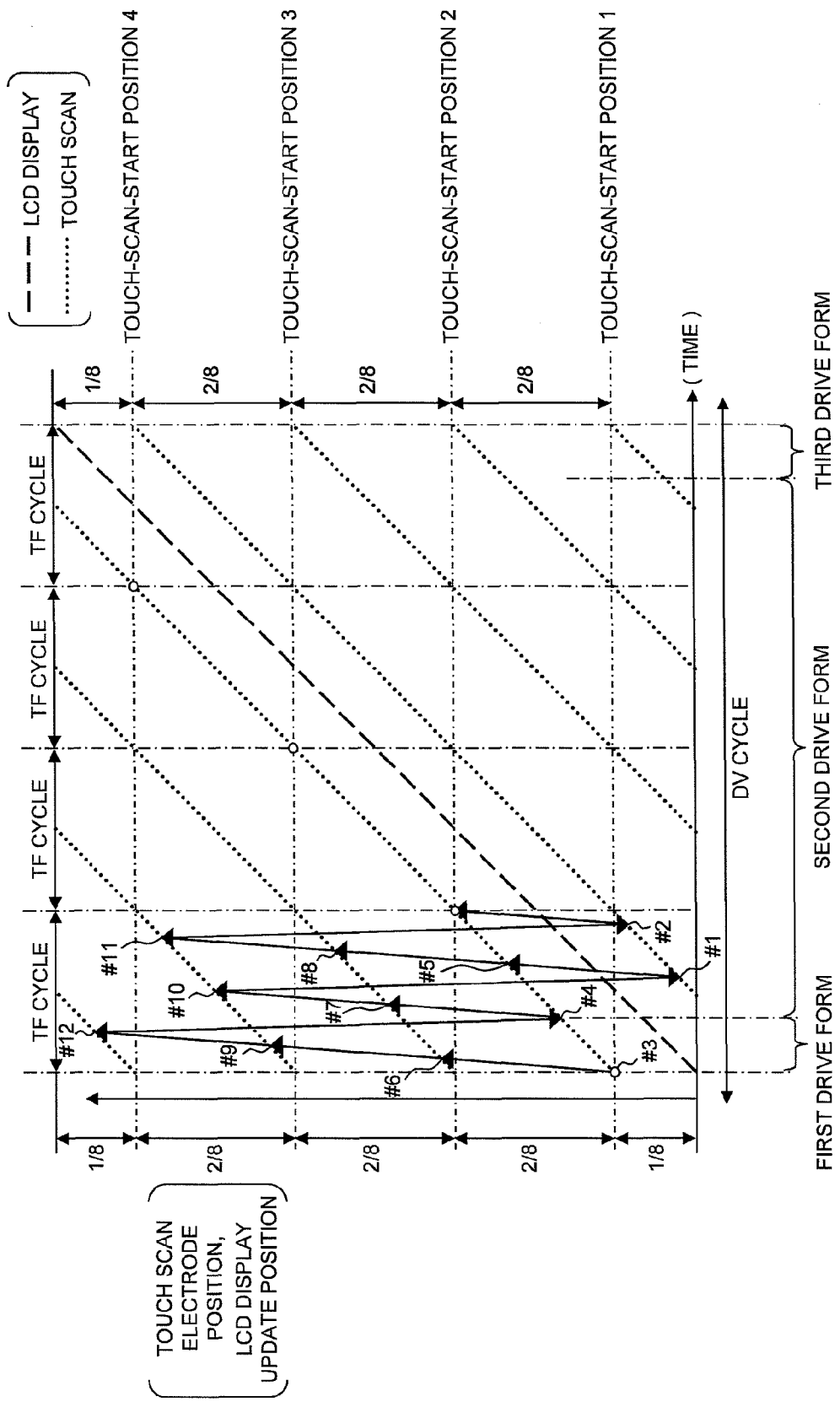
FIG. 5 is an explanatory diagram showing, by example, the order of driving the scan-drive electrodes according to the third embodiment of the driving-order-calculation logic.

FIG. 5 shows, by example, the order of driving the scan-drive electrodes according to the third embodiment of the driving-order-calculation logic. Here, the case of performing a touch detection (touch scan) with four detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by one-eighth of one display frame cycle (a phase representing one-eighth picture frame of the display plane), delayed by a phase representing one-eighth picture frame, advanced by three-eighths cycle (a phase representing three-eighths picture frame of the display plane), delayed by a phase representing three-eighths picture frame, advanced by five-eighths cycle (a phase representing five-eighths picture frame of the display plane), delayed by a phase representing five-eighths picture frame, or advanced by seven-eighths cycle (a phase representing seven-eighths picture frame of the display plane), or delayed by a phase representing seven-eighths picture frame are selectively driven with one-fourth cycle of mutual phase difference, whereby the driving of the detection-scan electrodes is controlled so as to be able to keep a display-scan-drive position and a touch-scan position (detection-scan-drive position) spaced apart from each other by a phase representing no less than about one-eighth picture frame at all times.

Further in detail, in the driving-order-calculation logic, the detection frame cycle is one-fourth of one display frame cycle. In FIG. 5, it is assumed that the touch panel 3 has 12 detection-scan electrodes, the electrode numbers of which are 1 to 12 in the array order of the electrodes. In the first detection frame cycle TF in one display frame cycle DV, the electrode numbers are denoted by #1 to #12 for the sake of convenience; as to the subsequent detection frame cycles, electrode positions and numbers are omitted in the drawing.

In the first drive form according to the third embodiment, the following are driven: the detection-scan electrode #3 having the first phase difference (one-eighth cycle); the detection-scan electrode #6 having the second phase difference (three-eighths cycle); the detection-scan electrode #9 having the third phase difference (five-eighths cycle); and the detection-scan electrode #12 having the fourth phase difference (seven-eighths cycle), provided that the phase differences arise in the phase-advance direction with respect to a display-scan electrode drive position of the liquid crystal panel 2. In the second drive form, the following are driven: the detection-scan electrodes #4, etc. having the first phase difference (one-eighth cycle), the detection-scan electrodes #7, #8, etc. having the second phase difference (three-eighths cycle), and the detection-scan electrodes #10, #11, etc. having the third phase difference (five-eighths cycle), provided that the phase differences arise in the phase-advance direction with respect to a display-scan electrode drive position of the liquid crystal panel 2; and the detection-scan electrodes #1, #2, etc. having the first phase difference (one-eighth cycle), the detection-scan electrodes having the second phase difference (three-eighths cycle), and the detection-scan electrodes having the third phase difference (five-eighths cycle) provided that the phase differences arise in the phase-delay direction with respect to a display-scan electrode drive position of the liquid crystal panel 2. In the third drive form, the following are driven: the detection-scan electrodes having the first phase difference (one-eighth cycle); the detection-scan electrodes having the second phase difference (two-eighths cycle); the detection-scan electrodes having the third phase difference (three-eighths cycle); and the detection-scan electrodes having the fourth phase difference (seven-eighths cycle), provided that the phase differences arise in the phase-delay direction with respect to a display-scan electrode drive position of the liquid crystal panel 2.

According to the arrangement like this, the minimum value of spatial distances between a touch-detection-scan position and display-scan positions, for which all of display-scan positions are taken into account, can be ensured to be maximized in the case of assigning four detection frame cycles to each display frame cycle. In short, such spatial distances can be ensured anywhere to be no less than one-eighth cycle.

In the third embodiment, the driving-order-calculation circuit 31 drives the detection-scan electrodes in the first drive form and subsequently, in the second drive form in the first detection frame cycle of the display frame cycle. In the second and third detection frame cycles of the display frame cycle, the driving-order-calculation circuit 31 drives the detection-scan electrodes in the second drive form. In the fourth detection frame cycle of the display frame cycle, the driving-order-calculation circuit 31 drives the detection-scan electrodes in the second drive form and subsequently, in the third drive form. The order of driving the detection-scan electrodes corresponding to the array order of the detection-scan electrodes in each detection frame cycle is determined as follows. Assuming that 8m detection-scan electrodes having array numbers 1 to 8m (m is a positive integer) are driven in each detection frame cycle, the electrode number tx (representing each of signal numbers 1 to n of select signals TX1 to TXn) of the k-th (k is a natural number up to 8m) detection-scan electrode to be driven is given by:

m+(k+3)/4 when k=1, 5, 9, . . . , 8m−3;
3m+(k+2)/4 when k=2, 6, 10, . . . , 8m−2;
5m+(k+1)/4 when k=3, 7, 11, . . . , 8m−1; and
(7m+k/4)mod(8m) when k=4, 8, 12, . . . , 8m. (See Formula Group 3.)

Formula Group 3

$$TX_{m+\frac{k+3}{4}} \quad :\text{when } k = 1, 5, 9, \ldots, 8m - 3 \quad \text{(i)}$$

$$TX_{\left(5m+\frac{k+1}{4}\right)} \quad :\text{when } k = 3, 7, 11, \ldots, 8m - 1 \quad \text{(ii)}$$

$$TX_{\left(5m+\frac{k+1}{4}\right)} \quad :\text{when } k = 3, 7, 11, \ldots, 8m - 1 \quad \text{(iii)}$$

$$TX_{\left(7m+\frac{k}{4}\right)\bmod(8m)} \quad :\text{when } k = 4, 8, 12, \ldots, 8m \quad \text{(iv)}$$

The Formula Group 3 applies to the case of m=2 and the final value of k is 8m−4 in the embodiment described with reference to FIG. 5.

According to the arrangement like this, a calculation for determining the driving order corresponding to the order of the array of touch panel detection-scan electrodes can be performed readily.

According to the third embodiment of the driving-order-calculation logic, the order of driving the electrodes for touch scan can be set to be a required order on condition that four touch frame cycles are arranged in each display frame cycle. The touch scan can be performed on one electrode which is distant from an electrode a liquid crystal panel 2 in use for overwrite at all times, and thus the interference with display can be suppressed. Therefore, the following are made possible: to eliminate the distortion of display owing to the arrangement of an electrode commonly used for both touch scan and the display overwrite of the liquid crystal panel 2; and to reduce the interference with a result of touch scan owing to the overwrite on liquid crystal panel 2. The same is true for the case of performing the touch scan five or more times during one display period, although this is not particularly explained here.

<<Fourth Embodiment of the Driving-Order-Calculation Logic>>

In the calculation logic according to the fourth embodiment, the detection frame cycle is one half of the display frame cycle, and the detection-scan electrodes where any of the first phase difference and a phase difference in the vicinity thereof, and the second phase difference and a phase difference in the vicinity thereof in the phase-advance and phase-delay directions will develop are driven. Especially, the fourth embodiment involves one kind of phase difference in the vicinity of the first phase difference, and one kind of phase difference in the vicinity of the second phase difference.

Figure 6:
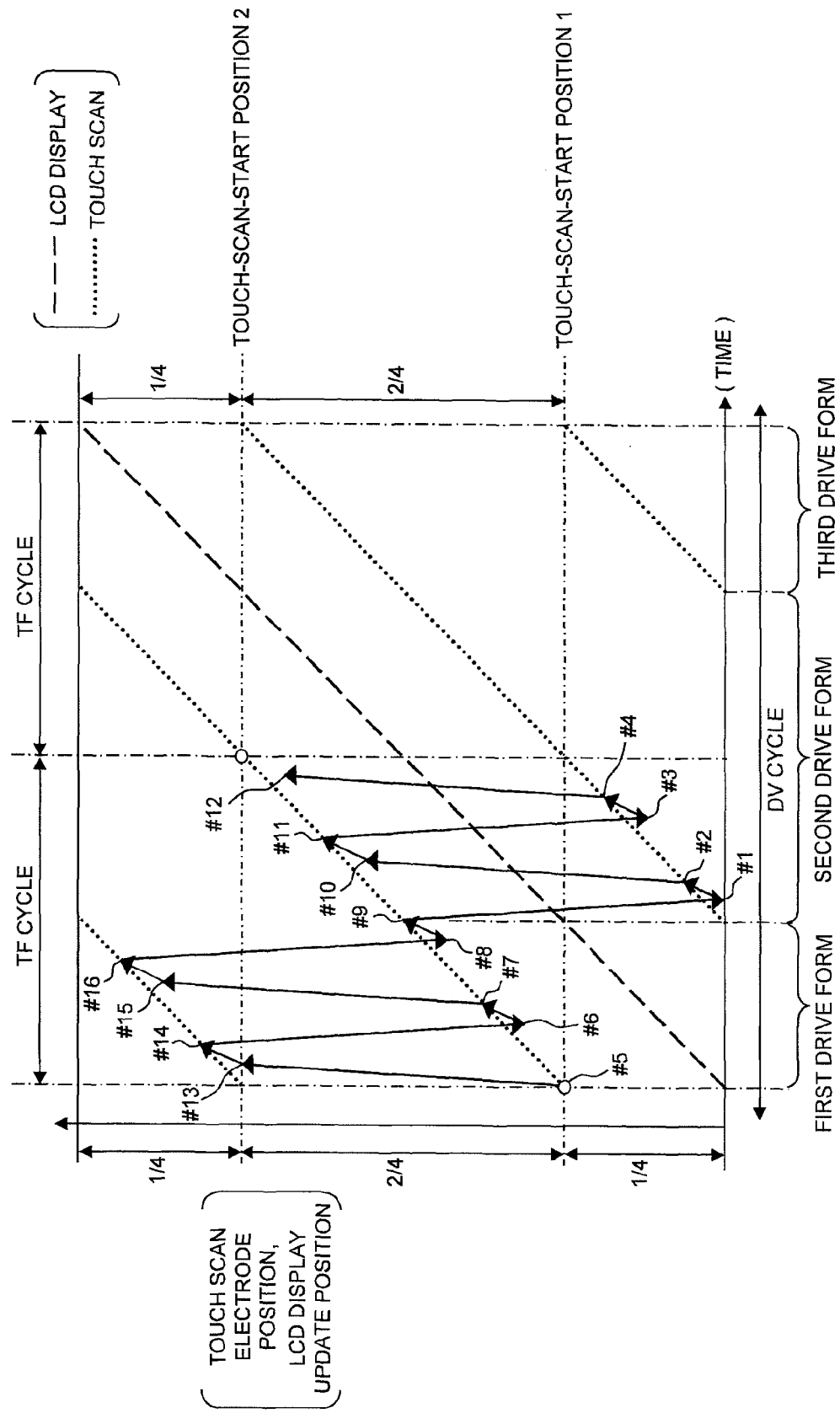
FIG. 6 is an explanatory diagram showing, by example, the order of driving the scan-drive electrodes according to the fourth embodiment of the driving-order-calculation logic.

FIG. 6 shows, by example, the order of driving the scan-drive electrodes according to the fourth embodiment of the driving-order-calculation logic. Here, the case of performing a touch detection (touch scan) with two detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by one-fourth of one display frame cycle (a phase representing one-fourth picture frame of the display plane), delayed by a phase representing one-fourth picture frame, advanced by three-fourths of one display frame cycle (a phase representing three-fourths picture frame of the display plane), or delayed by a phase representing three-fourths picture frame, or the detection-scan electrodes located at detection-scan-drive positions in the vicinities thereof are selectively driven with about one half cycle of mutual phase difference, whereby the driving of the detection-scan electrodes is controlled so as to be able to keep a display-scan-drive position and a touch-scan position (detection-scan-drive position) spaced apart from each other by a phase representing about one-fourth picture frame at all times.

Further in detail, in the driving-order-calculation logic of the fourth embodiment, the detection frame cycle is one half of one display frame cycle. In FIG. 6, it is assumed that the touch panel 3 has 16 detection-scan electrodes, the electrode numbers of which are 1 to 16 in the array order of the electrodes. In the first detection frame cycle TF in one display frame cycle DV, the electrode numbers are denoted by #1 to #16 for the sake of convenience; as to the subsequent detection frame cycles, electrode positions and numbers are omitted in the drawing.

In the first drive form according to the fourth embodiment, the following are driven: the detection-scan electrodes #5 to #9 having the first phase difference (one-fourth cycle) and a phase difference in the vicinity thereof, and the second phase difference (three-fourths cycle) and the phase difference in the vicinity thereof, provided that the phase differences arise in the phase-advance direction with respect to a display-scan electrode drive position of the liquid crystal panel 2, and #6 denotes a detection-scan electrode in the vicinity of the detection-scan electrode #7, and #8 denotes a detection-scan electrode in the vicinity of the detection-scan electrode #9. In the second drive form, the following are driven: the detection-scan electrodes #10 to #12, etc. having the first phase difference (one-fourth cycle) and a phase difference in the vicinity thereof, provided that the phase differences arise in the phase-advance direction with respect to a display-scan electrode drive position of the liquid crystal panel 2; and the detection-scan electrodes #1 to #4, etc. having the first phase difference (one-fourth cycle) and a phase difference in the vicinity thereof, provided that the phase differences arise in the phase-delay direction with respect to a display-scan electrode drive position of the liquid crystal panel 2, #10 denotes a detection-scan electrode in the vicinity of the detection-scan electrode #11, #1 denotes a detection-scan electrode in the vicinity of the detection-scan electrode #2, and #3 denotes a detection-scan electrode in the vicinity of the detection-scan electrode #4. In the third drive form, the following are driven: the detection-scan electrodes having the first phase difference (one-fourth cycle) and a phase difference in the vicinity thereof, and the detection-scan electrodes having the second phase difference (three-fourths cycle) and a phase difference in the vicinity thereof, provided that the phase differences arise in the phase-delay direction with respect to a display-scan electrode drive position of the liquid crystal panel 2.

The arrangement like this can bring about, by means of the switching to a phase difference in the vicinity of the latest phase difference, the same effect and advantage can be obtained without the need for widely switching the phase of the detection-scan electrode of the touch panel 3 each time the display-scan electrode is switched as performed in the first embodiment. It is noted that in the fourth embodiment, with two detection frame cycles assigned to each display frame cycle, the minimum value of spatial distances between a touch-detection-scan position and display-scan positions, for which all of display-scan positions are taken into account, is smaller than that in the first embodiment. The expression "in the vicinity" is used herein on the premise that one electrode is never used for both of update of display and touch scan concurrently, or electrodes are distant from each other to the extent that signals on them do not interfere with each other.

In the fourth embodiment, the driving-order-calculation circuit 31 drives the detection-scan electrodes in the first drive form and subsequently, in the second drive form in the first half detection frame cycle of the display frame cycle. The driving-order-calculation circuit 31 drives the detection-scan electrodes in the second drive form and subsequently, in the third drive form in the latter half detection frame cycle of the display frame cycle. The order of driving the detection-scan electrodes corresponding to the array order of the detection-scan electrodes in each detection frame cycle is determined as follows. Assuming that 4m detection-scan electrodes having array numbers 1 to 4m (m is a positive integer) are driven in each detection frame cycle, the electrode number tx (representing each of signal numbers 1 to n of select signals TX1 to TXn) of the detection-scan electrode to be driven at the k-th (first to 4m-th) turn is given by:

m+(k+1)/2 when k=1, 5, 9, . . . , 4m−3;
(3m+k/2)mod(4m) when k=2, 6, 10, . . . , m−2;
{3m+(k+1)/2} mod(4m) when k=3, 7, 11, . . . , 4m−1;
m+k/2 when k=4, 8, 12, . . . , 4m. (See Formula Group 4.)

Formula Group 4

$TX_{m+\frac{k+1}{2}}$ : when $k = 1, 5, 9, \ldots, 4m-3$ (i)

$TX_{(3m+\frac{k}{2})mod(4m)}$ : when $k = 2, 6, 10, \ldots, 4m-2$ (ii)

$TX_{(3m+\frac{k+1}{2})mod(4m)}$ : when $k = 3, 7, 11, \ldots, 4m-1$ (iii)

$TX_{(m+\frac{k}{2})}$ : when $k = 4, 8, 12, \ldots, 4m$ (iv)

In the embodiment described with reference to FIG. 6, m=4.

According to the arrangement like this, a calculation for determining the driving order corresponding to the order of the array of touch panel detection-scan electrodes can be performed readily.

According to the fourth embodiment of the driving-order-calculation logic, the order of driving the electrodes for touch scan can be set to be a required order on condition that two touch frame cycles are arranged in each display frame cycle. The touch scan can be performed on one electrode which is distant from an electrode a liquid crystal panel 2 in use for overwrite at all times, and thus the interference with display can be suppressed. Therefore, the following are made possible: to eliminate the distortion of display owing to the arrangement of an electrode commonly used for both touch scan and the display overwrite of the liquid crystal panel 2; and to reduce the interference with a result of touch scan owing to the overwrite on liquid crystal panel 2.

<<Fifth Embodiment of the Driving-Order-Calculation Logic>>

In the calculation logic according to the fifth embodiment, the detection frame cycle is one half of the display frame cycle, and two phase differences in the vicinity of the first phase difference, and two phase differences in the vicinity of the second phase difference are used to drive the detection-scan electrodes in each drive form.

Figure 7:
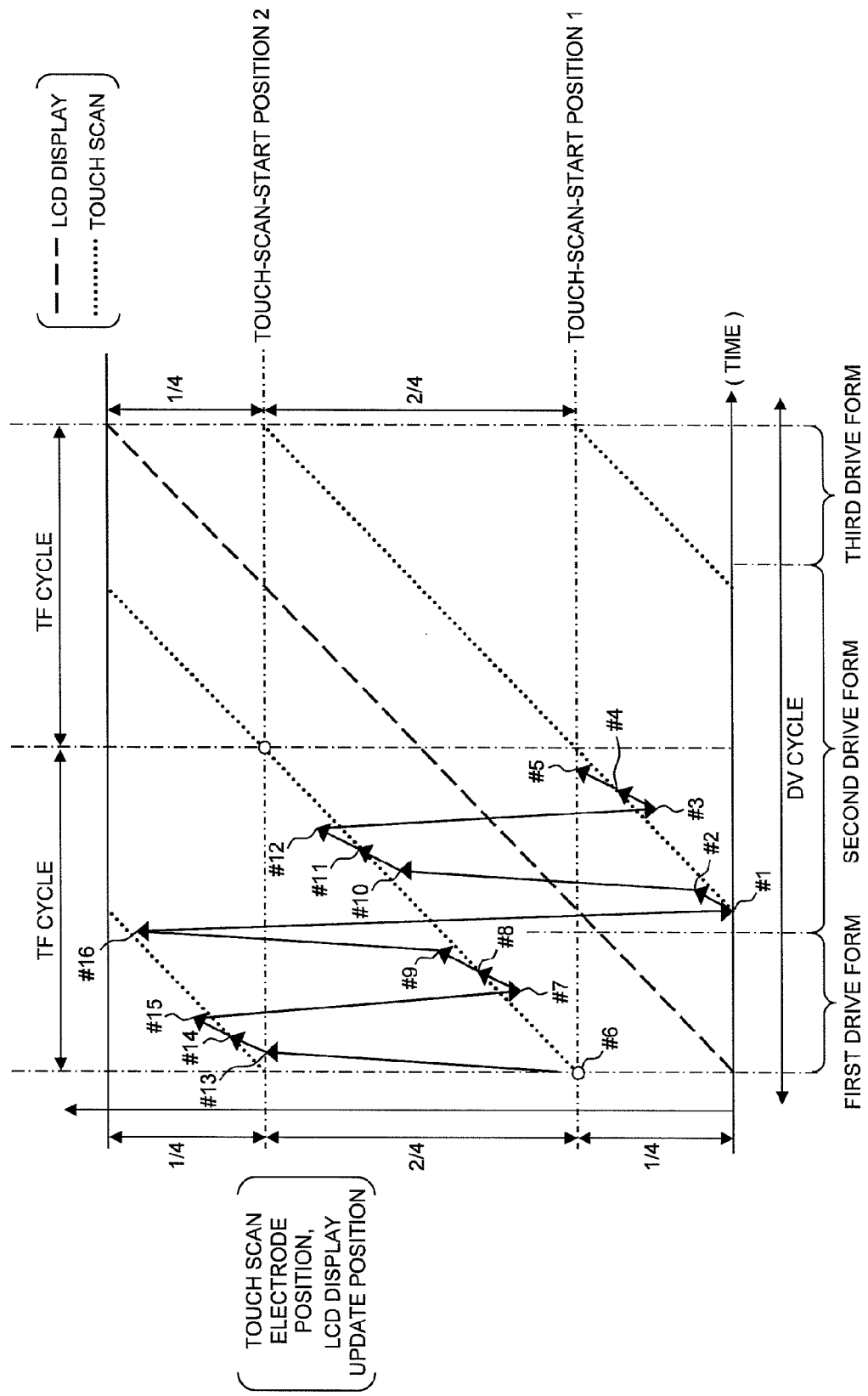
FIG. 7 is an explanatory diagram showing, by example, the order of driving the scan-drive electrodes according to the fifth embodiment of the driving-order-calculation logic.

FIG. 7 shows, by example, the order of driving the scan-drive electrodes according to the fifth embodiment of the driving-order-calculation logic. The fifth embodiment is identical to the fourth embodiment described with reference to FIG. 6 in that a touch detection (touch scan) is performed with two detection frame cycles (TF cycles) arranged in one display frame cycle (DV cycle). Therefore, the fifth and fourth embodiments have the following point in common. That is, as shown in the drawing, the detection-scan electrodes located at detection-scan-drive positions where from a display update position (display-scan-drive position) in the display plane, the electrode will be advanced by one-fourth of one display frame cycle (a phase representing one-fourth picture frame of the display plane), delayed by a phase representing one-fourth picture frame, advanced by three-fourths of one display frame cycle (a phase representing three-fourths picture frame of the display plane), or delayed by a phase representing three-fourths picture frame, or the detection-scan electrodes located at detection-scan-drive positions in the vicinity thereof are selectively driven with about one half cycle of mutual phase difference, whereby the driving of the detection-scan electrodes is controlled so as to be able to keep a display-scan-drive position and a touch-scan position (detection-scan-drive position) spaced apart from each other by a phase representing no less than about one-fourth picture frame at all times. The fifth embodiment is different from the fourth embodiment in that the detection-scan-drive positions set in the vicinity of a phase difference of one-fourth cycle and a phase difference of three-fourths cycle are increased to two kinds for each phase difference.

Further in detail, in the driving-order-calculation logic of the fifth embodiment, the detection frame cycle is one half of one display frame cycle. In FIG. 7, it is assumed that the touch panel 3 has 16 detection-scan electrodes, the electrode numbers of which are 1 to 16 in the array order of the electrodes. In the first detection frame cycle TF in one display frame cycle DV, the electrode numbers are denoted by #1 to #16 for the sake of convenience; as to the subsequent detection frame cycles, electrode positions and numbers are omitted in the drawing.

In the first drive form according to the fifth embodiment, the following are driven: the detection-scan electrodes #6 to #9 having two kinds of phase differences, i.e. the first phase difference (one-fourth cycle) and a phase difference in the vicinity thereof; and the detection-scan electrodes #13 to #16 having two kinds of phase differences, i.e. the second phase difference (three-fourths cycle) and a phase difference in the vicinity thereof, provided that the phase differences arise in the phase-advance direction with respect to a display-scan electrode drive position of the liquid crystal panel 2, #7 and #9 denote detection-scan electrodes in the vicinity of the detection-scan electrode #8, and #13 and #15 denote detection-scan electrodes in the vicinity of the detection-scan electrode #14. In the second drive form, the following are driven: the detection-scan electrodes #10 to #12, etc. having the first phase difference (one-fourth cycle) and a phase difference in the vicinity thereof, provided that the phase differences arise in the phase-advance direction with respect to a display-scan electrode drive position of the liquid crystal panel 2; and the detection-scan electrodes #1 to #5, etc. having the first phase difference (one-fourth cycle) and a phase difference in the vicinity thereof, provided that the phase differences arise in the phase-delay direction with respect to a display-scan electrode drive position of the liquid crystal panel 2, #10 and #12 denote detection-scan electrodes in the vicinity of the detection-scan electrode #11, #2 denotes a detection-scan electrode in the vicinity of the detection-scan electrode #1, and #3 and #5 denote detection-scan electrodes in the vicinity of the detection-scan electrode #4. In the third drive form, the following are driven: the detection-scan electrodes having the first phase difference (one-fourth cycle) and a phase difference in the vicinity thereof; and the detection-scan electrodes having the second phase difference (three-fourths cycle) and a phase difference in the vicinity thereof, provided that the phase differences arise in the phase-delay direction with respect to a display-scan electrode drive position of the liquid crystal panel 2.

In the fifth embodiment, the driving-order-calculation circuit 31 drives the detection-scan electrodes in the first drive form and subsequently, in the second drive form in the first half detection frame cycle of the display frame cycle. The driving-order-calculation circuit 31 drives the detection-scan electrodes in the second drive form and subsequently, in the third drive form in the latter half detection frame cycle of the display frame cycle. The order of driving the detection-scan electrodes corresponding to the array order of the detection-scan electrodes in each detection frame cycle is determined as follows. Assuming that 4m detection-scan electrodes having array numbers 1 to 4m (m is a positive integer) are driven in each detection frame cycle, the electrode number tx (representing each of signal numbers 1 to n of select signals TX1 to TXn) of the detection-scan electrode to be driven at the k-th (first to 4m-th) turn is given by:

m+(k+1)/2 when k=1, 7, 13, . . . , 4m−5;
(3m+k/2)mod(4m) when k=2, 8, 14, . . . , 4m−4;
{3m+(k+1)/2} mod(4m) when k=3, 9, 15, . . . , 4m−3;
{3m+(k+3)/2} mod(4m) when k=4, 10, 16, . . . , 4m−2;
m+(k−1)/2 when k=5, 11, 17, . . . , 4m−1; and
m+k/2 when k=6, 12, 18, . . . , 4m. (See Formula Group 5.)

Formula Group 5

$TX_{m+\frac{k+1}{2}}$ : when $k = 1, 7, 13, \ldots, 4m-5$ (i)

-continued $TX_{(3m+\frac{k}{2})mod(4m)}$ : when $k = 2, 8, 14, \ldots, 4m-4$ (ii)

$TX_{(3m+\frac{k+1}{2})mod(4m)}$ : when $k = 3, 9, 15, \ldots, 4m-3$ (iii)

$TX_{(3m+\frac{k+3}{2})mod(4m)}$ : when $k = 4, 10, 16, \ldots, 4m-2$ (iv)

$TX_{(m+\frac{k-1}{2})}$ : when $k = 5, 11, 17, \ldots, 4m-1$ (v)

$TX_{(m+\frac{k}{2})}$ : when $k = 6, 12, 18 \ldots, 4m$ (vi)

In the embodiment described with reference to FIG. 7, m=4.

The arrangement like this brings about the same effect and advantage as those the fourth embodiment does. While no special description is presented, the fourth and fifth embodiments are not limited so as to perform a touch scan twice during one display period. The touch scan may be executed an appropriate number of times, e.g. three or four times as in the second and third embodiments, which brings about the same effect and advantage.

<<Sixth Embodiment of the Driving-Order-Calculation Logic>>

In the calculation logic according to the sixth embodiment, the detection frame cycle is one half of the display frame cycle, and the detection-scan electrodes where any of first to fourth phase differences will develop in the phase-advance and phase-delay directions are driven.

Figure 8:
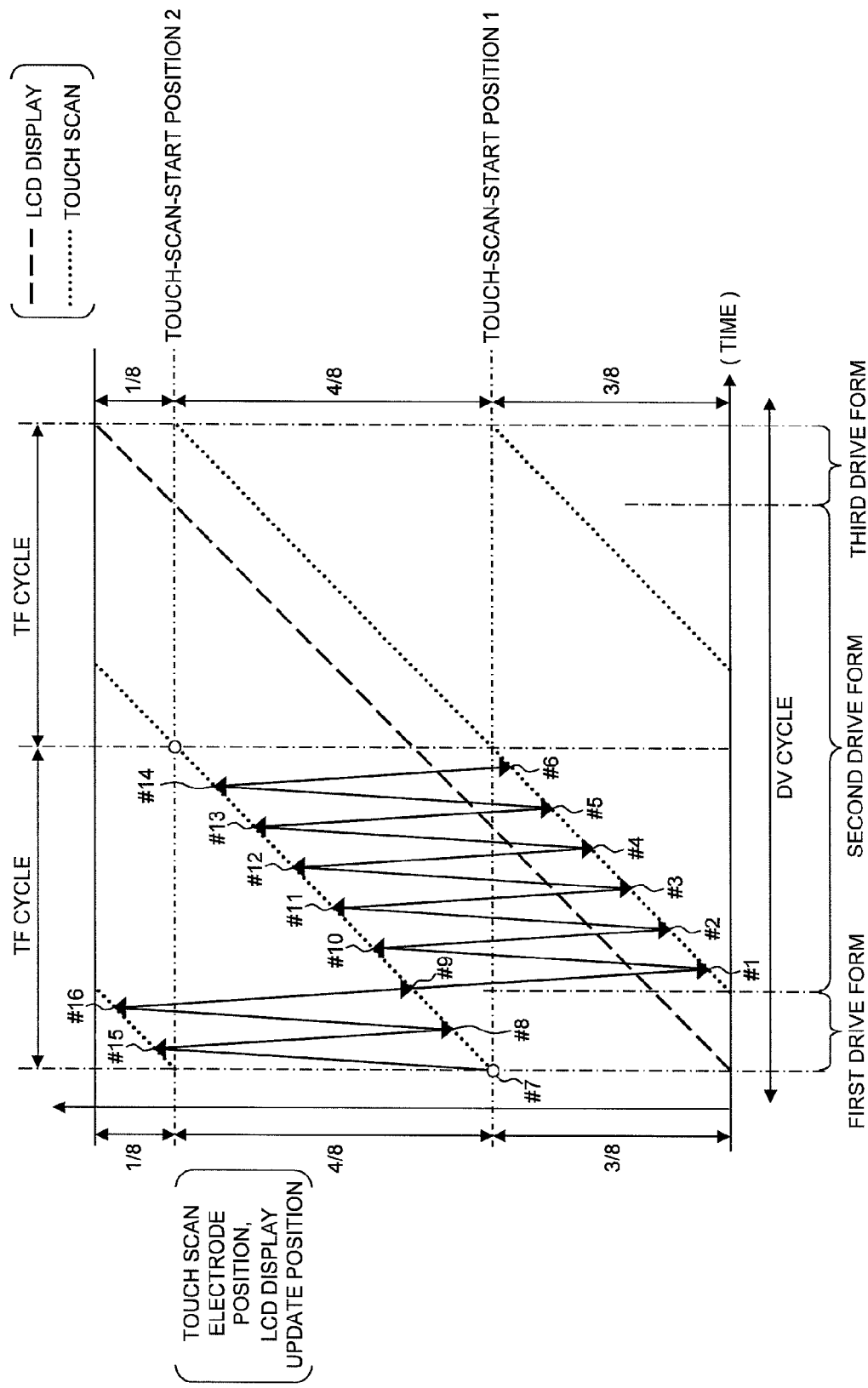
FIG. 8 is an explanatory diagram showing, by example, the order of driving the scan-drive electrodes according to the sixth embodiment of the driving-order-calculation logic.

FIG. 8 shows, by example, the order of driving the scan-drive electrodes according to the sixth embodiment of the driving-order-calculation logic. Here, the case of performing a touch detection (touch scan) with two detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by three-eighths of one display frame cycle (a phase representing three-eighths picture frame of the display plane), advanced by a phase representing seven-eighths picture frame, delayed by a phase representing one-eighth picture frame, or delayed by a phase representing five-eighths picture frame are selectively driven with four-eighths cycle of mutual phase difference, whereby the driving of the detection-scan electrodes is controlled so as to be able to keep a display-scan-drive position and a touch-scan position (detection-scan-drive position) spaced apart from each other by a phase representing at least about one-eighth picture frame at all times.

Further in detail, in the driving-order-calculation logic, the detection frame cycle is one half of one display frame cycle. In FIG. 8, it is assumed that the touch panel 3 has 16 detection-scan electrodes, the electrode numbers of which are 1 to 16 in the array order of the electrodes. In the first half detection frame cycle TF in one display frame cycle DV, the electrode numbers are denoted by #1 to #16 for the sake of convenience; as to the subsequent detection frame cycle, electrode positions and numbers are omitted in the drawing.

In the first drive form, the following are driven: the detection-scan electrodes #7 and #9 having the first phase difference (three-eighths cycle); and the detection-scan electrodes #15 and #16 having the second phase difference (seven-eighths cycle), provided that the phase differences arise in the phase-advance direction with respect to a display-scan electrode drive position of the liquid crystal panel 2. In the second drive form, the following are driven: the detection-scan electrodes #9 to #14, etc. having the first phase difference (three-eighths cycle) in the phase-advance direction with respect to a display-scan electrode drive position of the liquid crystal panel 2; and the detection-scan electrodes #1 to #6, etc. having the third phase difference (one-eighth cycle) in the phase-delay direction with respect to a display-scan electrode drive position of the liquid crystal panel 2. In the third drive form, the following are driven: the detection-scan electrodes having the third phase difference (one-eighth cycle), and the detection-scan electrodes having the fourth phase difference (five-eighths cycle), provided that the phase differences arise in the phase-delay direction with respect to a display-scan electrode drive position of the liquid crystal panel 2.

In the sixth embodiment, the driving-order-calculation circuit 31 drives the detection-scan electrodes in the first drive form and subsequently, in the second drive form in the first half detection frame cycle of the display frame cycle. The driving-order-calculation circuit 31 drives the detection-scan electrodes in the second drive form and subsequently, in the third drive form in the latter half detection frame cycle of the display frame cycle. The order of driving the detection-scan electrodes corresponding to the array order of the detection-scan electrode in each detection frame cycle is determined as follows. Assuming that 8m detection-scan electrodes having array numbers 1 to 8m (m is a positive integer) are driven in each detection frame cycle, the electrode number tx (representing each of signal numbers 1 to n of select signals TX1 to TXn) of the detection-scan electrode to be driven at the k-th (first to 8m-th) turn is given by:

3m+(k+1)/2 when k=1, 3, 5, . . . , 8m−1; and
(7m+k/2)mod(8m) when k=2, 4, 6, . . . , 8m. (See Formula Group 6.)

Formula Group 6

$$TX_{3m+\frac{k+1}{2}} \quad : \text{when } k = 1, 3, 5, \ldots, 8m-1 \quad \text{(i)}$$

$$TX_{(7m+\frac{k}{2}) \bmod (8m)} \quad : \text{when } k = 2, 4, 6, \ldots, 8m \quad \text{(ii)}$$

As to the Formula Group 6, m=2 in the embodiment described with reference to FIG. 8.

According to the arrangement like this, the minimum value of spatial distances between a touch-detection-scan position and display-scan positions becomes smaller than that in the first embodiment, but it becomes possible to accommodate e.g. a situation that requires a degree of freedom for setting a phase difference because of increased kinds of phase differences to be used. Further, the sixth embodiment brings about the same effect and advantage that the first embodiment does.

<<Seventh Embodiment of the Driving-Order-Calculation Logic>>

In the calculation logic according to the seventh embodiment, the detection frame cycle is one half of the display frame cycle, and the detection-scan electrodes where any of first to fourth phase differences will develop in the phase-advance and phase-delay directions are driven. The seventh embodiment is different from the sixth embodiment in the arrangement of values of first to fourth phase differences. In this embodiment, the first phase difference is one-eighth cycle; the second phase difference is five-eighths cycle; the third phase difference is three-eighths cycle; and the fourth phase difference is seven-eighths cycle. The relation among phases in the touch detection frame cycle in the display frame cycle is reverse to that in the sixth embodiment.

FIG. 9 shows, by example, the order of driving the scan-drive electrodes according to the sixth embodiment of the driving-order-calculation logic. Here, the case of performing a touch detection (touch scan) with two detection frame cycles (TF cycles) arranged in one display frame cycle (DV cycle) is taken as an example. As shown in the drawing, the detection-scan electrodes located at detection-scan-drive positions where from a display update position (display-scan-drive position) in the display plane, the electrode will be advanced by one-eighth of one display frame cycle (a phase representing one-eighth picture frame of the display plane), advanced by a phase representing five-eighths picture frame, delayed by a phase representing three-eighths picture frame, or delayed by a phase representing seven-eighths picture frame are selectively driven with four-eighths cycle of mutual phase difference, whereby the driving of the detection-scan electrodes is controlled so as to be able to keep a display-scan-drive position and a touch-scan position (detection-scan-drive position) spaced apart from each other by a phase representing at least about one-eighth picture frame at all times.

Further in detail, in the driving-order-calculation logic, the detection frame cycle is one half of one display frame cycle. In FIG. 9, it is assumed that the touch panel 3 has 16 detection-scan electrodes, the electrode numbers of which are 1 to 16 in the array order of the electrodes. In the first half detection frame cycle TF in one display frame cycle DV, the electrode numbers are denoted by #1 to #16 for the sake of convenience; as to the subsequent detection frame cycle, electrode positions and numbers are omitted in the drawing.

In the first drive form, the following are driven: the detection-scan electrodes #3 to #8 having the first phase difference (one-eighth cycle), and the detection-scan electrodes #11 to #16 having the second phase difference (five-eighths cycle), provided that the phase differences arise in the phase-advance direction with respect to a display-scan electrode drive position of the liquid crystal panel 2. In the second drive form, the following are driven: the detection-scan electrodes #10, etc. having the first phase difference (one-eighth cycle) in the phase-advance direction with respect to a display-scan electrode drive position of the liquid crystal panel 2; and the detection-scan electrode #1, #2, etc. having the third phase difference (three-eighths cycle) in the phase-delay direction with respect to a display-scan electrode drive position of the liquid crystal panel 2. In the third drive form, the following are driven: the detection-scan electrodes having the third phase difference (three-eighths cycle), and the detection-scan electrodes having the fourth phase difference (seven-eighths cycle), provided that the phase differences arise in the phase-delay direction with respect to a display-scan electrode drive position of the liquid crystal panel 2.

In the seventh embodiment, the driving-order-calculation circuit 31 drives the detection-scan electrodes in the first drive form and subsequently, in the second drive form in the first half detection frame cycle of the display frame cycle. The driving-order-calculation circuit 31 drives the detection-scan electrodes in the second drive form and subsequently, in the third drive form in the latter half detection frame cycle of the display frame cycle. The order of driving the detection-scan electrodes corresponding to the array order of the detection-scan electrodes in each detection frame cycle is determined as follows. Assuming that 8m detection-scan electrodes having array numbers 1 to 8m (m is a positive integer) are driven in each detection frame cycle, the electrode number tx (representing each of signal numbers 1 to n of select signals TX1 to TXn) of the detection-scan electrode to be driven at the k-th (first to 8m-th) turn is given by:

m+(k+1)/2 when k=1, 3, 5, . . . , 8m−1; and
(5m+k/2)mod(8m) when k=2, 4, 6, . . . , 8m. (See Formula Group 7.)

Formula Group 7

$$TX_{m+\frac{k+1}{2}} \quad : \text{when } k = 1, 3, 5, \ldots, 8m-1 \quad \text{(i)}$$

$$TX_{\left(5m+\frac{k}{2}\right)mod(8m)} \quad : \text{when } k = 2, 4, 6, \ldots, 8m \quad \text{(ii)}$$

As to the above Formula Group 7, m=2 in the embodiment described with reference to FIG. 9.

According to the arrangement like this, the minimum value of spatial distances between a touch-detection-scan position and display-scan positions becomes smaller than that in the first embodiment, it becomes possible to accommodate e.g. a situation that requires a degree of freedom for setting a phase difference because of increased kinds of phase differences to be used. Further, the sixth embodiment brings about the same effect and advantage that the first embodiment does. While no special description is presented, the sixth and seventh embodiments are not limited so as to perform a touch scan twice during one display period. The sixth and seventh embodiments are applicable in the same way to a situation such that the touch scan is executed an appropriate number of times, e.g. three or four times as in the second and third embodiments.

The above-described embodiments bring about the effect and advantage as described below.

It is possible to constantly keep a spatial distance between a display-scan position and a touch-detection-scan position with any timing in the display frame cycle. As a result, the occurrence of signal interference between a display-scan position and a touch-detection-scan position can be avoided. Therefore, on condition that the detection frame cycle of the touch panel 3 is shorter than the display frame cycle of the liquid crystal panel 2, the coincidence or overlap of a display-scan position and a touch-detection-scan position can be avoided even without thinning touch detections, which contributes to the increase in the accuracy of touch detection, and the suppression of the worsening of the display quality of the liquid crystal panel 2. The effect and advantage like this are ensured even in the case of commonly using detection-scan electrodes (or other electrodes which are changed in potential in line with them) of the touch panel 3, and display-scan electrodes (or other electrodes which are changed in potential in line with them) of the liquid crystal panel 2.

In addition, the adoption of three drive forms, i.e. the first to third drive forms, can eliminate the need for thinning the touch-detection positions in each of two or more touch detection frame cycles in the display frame cycle. In addition, the minimum value of spatial distances between a touch-detection-scan position and display-scan positions, for which all of display-scan positions are taken into account can be raised readily.

The invention is not limited to the above embodiments. It is obvious that various changes and modifications may be made without departing from the subject matter thereof.

For instance, the number of touch scans to the display scans, and the phase difference in drive timing between display-scan electrodes, and the detection-scan electrodes are not limited to the specific embodiments described above, and they can be changed appropriately.

The frame synchronizing signal is not limited to a vertical synchronizing signal. It may be any signal as long as it has a synchronizing function. In addition, the dot matrix type display panel may be e.g. an electroluminescence panel, which is limited to a liquid crystal panel. The invention can be widely applied to not only portable information terminal devices including a tablet and a smart phone, but also other information terminal devices. The liquid crystal driver, the touch panel controller and the subprocessor are not limited so that they are integrated into one single chip. They may be formed in a multichip, otherwise may be formed into individual semiconductor integrated circuits respectively.

What is claimed is:

1. A touch panel controller which controls a touch panel having a detection plane superposed on a display plane of a display device arranged so that a display action is performed in synchronization with scan-driving of display-scan electrodes, and which scan-drives an array of detection-scan electrodes of the touch panel to perform a touch detection, comprising
a control part,
wherein the control part sets a detection frame cycle of the detection plane to 1/n of a display frame cycle for the display plane (n is a positive integer), and
the control part decides an order of driving the detection-scan electrodes in each detection frame cycle according to a predetermined phase-delay position and a predetermined phase-advance position with respect to a display-scan electrode drive position of the display device so as to correspond to an order of the detection-scan electrode array of the touch panel.

2. The touch panel controller according to claim 1, wherein the control part decides the order of driving the detection-scan electrodes in:
a first drive form for driving the detection-scan electrodes having predetermined phase differences in a phase-advance direction with respect to a display-scan electrode drive position of the display device;
a second drive form for driving the detection-scan electrodes having predetermined phase differences in the phase-advance direction with respect to a display-scan electrode drive position of the display device, and the detection-scan electrodes having predetermined phase differences in a phase-delay direction with respect to a display-scan electrode drive position of the display device; and
a third drive form for driving the detection-scan electrodes having predetermined phase differences in the phase-delay direction with respect to a display-scan electrode drive position of the display device.

3. The touch panel controller according to claim 2, wherein the control part sets the detection frame cycle to one half of the display frame cycle,
in the first drive form, the control part drives the detection-scan electrodes having the first and second phase differences, in the phase-advance direction with respect to a display-scan electrode drive position of the display device,
in the second drive form, the control part drives the detection-scan electrode having the first phase difference in the phase-advance direction with respect to a display-scan electrode drive position of the display device, and the detection-scan electrode having the first phase difference in the phase-delay direction with respect to a display-scan electrode drive position of the display device, and in the third drive form, the control part drives the detection-scan electrodes having the first and second phase differences in the phase-delay direction with respect to a display-scan electrode drive position of the display device.

4. The touch panel controller according to claim 3, wherein the first phase difference is one-fourth cycle, and the second phase difference is three-fourths cycle.

5. The touch panel controller according to claim 4, wherein the control part drives the detection-scan electrodes in the first drive form and subsequently, in the second drive form in a first half detection frame cycle of the display frame cycle,
the control part drives the detection-scan electrodes in the second drive form and subsequently, in the third drive form in the latter half detection frame cycle of the display frame cycle,
assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:
$m+(k+1)/2$ when $k=1, 3, 5, \ldots, 4m-1$; and
$(3m+k/2)\bmod(4m)$ when $k=2, 4, 6, \ldots, 4m$.

6. The touch panel controller according to claim 2, wherein the control part sets the detection frame cycle to one half of the display frame cycle,
in the first drive form, the control part drives the detection-scan electrodes having the first and second phase differences in the phase-advance direction with respect to a display-scan electrode drive position of the display device,
in the second drive form, the control part drives: the detection-scan electrode having the first phase difference in the phase-advance direction with respect to a display-scan electrode drive position of the display device; and the detection-scan electrode having the third phase difference in the phase-delay direction with respect to a display-scan electrode drive position of the display device, and
in the third drive form, the control part drives the detection-scan electrodes having the third and fourth phase differences in the phase-delay direction with respect to a display-scan electrode drive position of the display device.

7. The touch panel controller according to claim 6, wherein the first phase difference is three-eighths cycle,
the second phase difference is a seven-eighths cycle,
the third phase difference is one-eighth cycle, and
the fourth phase difference is five-eighths cycle.

8. The touch panel controller according to claim 7, wherein the control part drives the detection-scan electrodes in the first drive form and subsequently, in the second drive form in a first half detection frame cycle of the display frame cycle,
the control part drives the detection-scan electrodes in the second drive form and subsequently, in the third drive form in the latter half detection frame cycle of the display frame cycle,
assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:
$3m+(k+1)/2$ when $k=1, 3, 5, \ldots, 8m-1$; and
$(7m+k/2)\bmod(8m)$ when $k=2, 4, 6, \ldots, 8m$.

9. The touch panel controller according to claim 6, wherein the first phase difference is one-eighth cycle,
the second phase difference is five-eighths cycle,
the third phase difference is three-eighths cycle, and
the fourth phase difference is seven-eighths cycle.

10. The touch panel controller according to claim 9, wherein the control part drives the detection-scan electrodes in the first drive form and subsequently, in the second drive form in a first half detection frame cycle of the display frame cycle,
the control part drives the detection-scan electrodes in the second drive form and subsequently, in the third drive form in the latter half detection frame cycle of the display frame cycle,
assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:
$m+(k+1)/2$ when $k=1, 3, 5, \ldots, 8m-1$; and
$(5m+k/2)\bmod(8m)$ when $k=2, 4, 6, \ldots, 8m$.

11. The touch panel controller according to claim 2, wherein the control part sets the detection frame cycle to one-third of the display frame cycle,
in the first drive form, the control part drives the detection-scan electrodes having the first to third phase differences in the phase-advance direction with respect to a display-scan electrode drive position of the display device,
in the second drive form, the control part drives: the detection-scan electrodes having the first and second phase differences in the phase-advance direction with respect to a display-scan electrode drive position of the display device; and the detection-scan electrodes having the first and second phase differences in the phase-delay direction with respect to a display-scan electrode drive position of the display device,
in the third drive form, the control part drives the detection-scan electrodes having the first to third phase differences in the phase-delay direction with respect to a display-scan electrode drive position of the display device.

12. The touch panel controller according to claim 11, wherein the first phase difference is one-sixth cycle,
the second phase difference is three-sixths cycle, and
the third phase difference is five-sixths cycle.

13. The touch panel controller according to claim 12, wherein the control part drives the detection-scan electrodes in first drive form and subsequently, in the second drive form in a first detection frame cycle of the display frame cycle,
the control part drives the detection-scan electrodes in the second drive form in a second detection frame cycle of the display frame cycle subsequent thereto, and
the control part drives the detection-scan electrodes in the second drive form and subsequently, in the third drive form in a third detection frame cycle of the display frame cycle,
assuming that 6m detection-scan electrodes numbered 1 to 6m (m is a positive integer) are driven in each detection frame cycle, the k-th detection-scan electrode to be driven (k is a natural number up to 6m) in the order of driving the detection-scan electrodes in each detection frame cycle, corresponding to the order of the detection-scan electrode array, has an array number given by:
$m+(k+2)/3$ when $k=1, 4, 7, \ldots, 6m-2$;
$3m+(k+1)/3$ when $k=2, 5, 8, \ldots, 6m-1$; and
$(5m+k/3)\bmod(6m)$ when $k=3, 6, 9, \ldots, 6m$.

14. The touch panel controller according to claim 2, wherein the control part sets the detection frame cycle to one-fourth of the display frame cycle, in the first drive form, the control part drives the detection-scan electrodes having the first to fourth phase differences in the phase-advance direction with respect to a display-scan electrode drive position of the display device, in the second drive form, the control part drives the detection-scan electrodes having the first to third phase differences in the phase-advance direction with respect to a display-scan electrode drive position of the display device, and the detection-scan electrodes having the first to third phase differences in the phase-delay direction with respect to a display-scan electrode drive position of the display device, and in the third drive form, the control part drives the detection-scan electrodes having the first to fourth phase differences in the phase-delay direction with respect to a display-scan electrode drive position of the display device.

15. The touch panel controller according to claim 14, wherein the first phase difference is one-eighth cycle, the second phase difference is three-eighths cycle, the third phase difference is five-eighths cycle, and the fourth phase difference is seven-eighths cycle.

16. The touch panel controller according to claim 15, wherein the control part drives the detection-scan electrodes in first drive form and subsequently, in the second drive form in a first detection frame cycle of the display frame cycle, the control part drives the detection-scan electrodes in the second drive form in second to third detection frame cycles of the display frame cycle, the control part drives the detection-scan electrodes in the second drive form and subsequently, in the third drive form in a fourth detection frame cycle of the display frame cycle, assuming that 8m detection-scan electrodes numbered 1 to 8m (m is a positive integer) are driven in each detection frame cycle, the k-th detection-scan electrode to be driven (k is a natural number up to 8m) in the order of driving the detection-scan electrodes in each detection frame cycle, corresponding to the order of the detection-scan electrode array, has an array number given by:

$m+(k+3)/4$ when $k=1, 5, 9, \ldots, 8m-3$;

$3m+(k+2)/4$ when $k=2, 6, 10, \ldots, 8m-2$;

$5m+(k+1)/4$ when $k=3, 7, 11, \ldots, 8m-1$; and $(7m+k/4)\mod(8m)$ when $k=4, 8, 12, \ldots, 8m$.

17. The touch panel controller according to claim 2, wherein the control part sets the detection frame cycle to one half of the display frame cycle, in the first drive form, the control part drives the detection-scan electrodes having the first phase difference and a phase difference in the vicinity thereof, and the second phase difference and a phase difference in the vicinity thereof in the phase-advance direction with respect to a display-scan electrode drive position of the display device, in the second drive form, the control part drives: the detection-scan electrodes having the first phase difference and a phase difference in the vicinity thereof in the phase-advance direction with respect to a display-scan electrode drive position of the display device; and the detection-scan electrodes having the first phase difference and a phase difference in the vicinity thereof in the phase-delay direction with respect to a display-scan electrode drive position of the display device, and in the third drive form, the control part drives the detection-scan electrodes having the first phase difference and a phase difference in the vicinity thereof, and the second phase difference and a phase difference in the vicinity thereof in the phase-delay direction with respect to a display-scan electrode drive position of the display device.

18. The touch panel controller according to claim 17, wherein the first phase difference is one-fourth cycle, and the second phase difference is three-fourths cycle.

19. The touch panel controller according to claim 18, wherein the control part drives the detection-scan electrodes in the first drive form and subsequently, in the second drive form in a first half detection frame cycle of the display frame cycle, the control part drives the detection-scan electrodes in the second drive form and subsequently, in the third drive form in the latter half detection frame cycle of the display frame cycle, assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:

$m+(k+1)/2$ when $k=1, 5, 9, \ldots, 4m-3$;

$(3m+k/2)\mod(4m)$ when $k=2, 6, 10, \ldots, 4m-2$;

$\{3m+(k+1)/2\} \mod(4m)$ when $k=3, 7, 11, \ldots, 4m-1$; and $m+k/2$ when $k=4, 8, 12, \ldots, 4m$.

20. The touch panel controller according to claim 18, wherein the control part drives the detection-scan electrodes in the first drive form and subsequently, in the second drive form in a first half detection frame cycle of the display frame cycle, the control part drives the detection-scan electrodes in the second drive form and subsequently, in the third drive form in the latter half detection frame cycle of the display frame cycle, assuming that 4m detection-scan electrodes numbered 1 to 4m (m is a positive integer) are driven in each detection frame cycle, the k-th detection-scan electrode to be driven (k is a natural number up to 4m) in the order of driving the detection-scan electrodes in each detection frame cycle, corresponding to the order of the detection-scan electrode array, has an array number given by:

$m+(k+1)/2$ when $k=1, 7, 13, \ldots, 4m-5$;

$(3m+k/2)\mod(4m)$ when $k=2, 8, 14, \ldots, 4m-4$;

$\{3m+(k+1)/2\} \mod(4m)$ when $k=3, 9, 15, \ldots, 4m-3$;

$\{3m+(k+3)/2\} \mod(4m)$ when $k=4, 10, 16, \ldots, 4m-2$;

$m+(k-1)/2$ when $k=5, 11, 17, \ldots, 4m-1$; and $m+k/2$ when $k=6, 12, 18, \ldots, 4m$.

21. A semiconductor device comprising:

a display controller which scan-drives display-scan electrodes of a display device every cycle of a frame synchronizing signal to perform display control of the display device; and a touch panel controller which scan-drives detection-scan electrodes of a touch panel having a detection plane superposed on a display plane of the display device to perform a touch detection, wherein the touch panel controller sets a detection frame cycle of the detection plane to 1/n (n is a positive integer) of a display frame cycle according to the frame synchronizing signal to the display plane, and the touch panel controller decides an order of driving the detection-scan electrodes in each detection frame cycle according to a predetermined phase-delay position and a predetermined phase-advance position with respect to a display-scan electrode drive position of the display device so as to correspond to an order of the detection-scan electrode array of the touch panel.

22. The semiconductor device according to claim 21, wherein the touch panel controller decides the order of driving the detection-scan electrodes in:
- a first drive form for driving the detection-scan electrodes having predetermined phase differences in a phase-advance direction with respect to a display-scan electrode drive position of the display device;
- a second drive form for driving the detection-scan electrodes having predetermined phase differences in the phase-advance direction with respect to a display-scan electrode drive position of the display device, and the detection-scan electrodes having predetermined phase differences in a phase-delay direction with respect to a display-scan electrode drive position of the display device; and
- a third drive form for driving the detection-scan electrodes having predetermined phase differences in the phase-delay direction with respect to a display-scan electrode drive position of the display device.

\* \* \* \* \*